United States Patent
Dicker

(10) Patent No.: US 11,821,412 B2
(45) Date of Patent: Nov. 21, 2023

(54) CONTRACTILE DEVICE FOR USE AS AN ACTUATOR, PUMP OR COMPRESSOR

(71) Applicant: ACTUATION LAB LTD, Bristol (GB)

(72) Inventor: Michael Patrick Maher Dicker, Bristol (GB)

(73) Assignee: ACTUATION LAB LTD, Bristol (GB)

( * ) Notice: Subject to any disclaimer, the term of this patent is extended or adjusted under 35 U.S.C. 154(b) by 165 days.

(21) Appl. No.: 17/618,615

(22) PCT Filed: Jun. 15, 2020

(86) PCT No.: PCT/GB2020/051445
§ 371 (c)(1),
(2) Date: Dec. 13, 2021

(87) PCT Pub. No.: WO2020/249983
PCT Pub. Date: Dec. 17, 2020

(65) Prior Publication Data
US 2022/0252061 A1    Aug. 11, 2022

(30) Foreign Application Priority Data

Jun. 14, 2019    (GB) ...................................... 1908545

(51) Int. Cl.
*F04B 43/00*    (2006.01)
*F15B 15/10*    (2006.01)
*B25J 9/14*    (2006.01)

(52) U.S. Cl.
CPC ........ *F04B 43/0054* (2013.01); *F15B 15/103* (2013.01); *B25J 9/142* (2013.01)

(58) Field of Classification Search
CPC .. B25J 9/142; B25J 9/144; B25J 18/06; F04B 43/0054; F15B 15/103

(Continued)

(56) References Cited

U.S. PATENT DOCUMENTS 2,019,160 A * 10/1935 Semsch ...................... F16J 3/00
                                                              417/412
2,041,950 A    5/1936 Cover
(Continued)

FOREIGN PATENT DOCUMENTS

CN    1163647 A    10/1997
CN    108161929    6/2018
(Continued)

OTHER PUBLICATIONS

Jin-Gyu Lee and Hugo Rodrigue—Origami-Based Vacuum Pneumatic Artificial Muscles with Large Contraction Ratios, Soft Robotics, Feb. 2019, 9 pages. http://doi.org/10.1089/soro.2018.0063.
(Continued)

*Primary Examiner* — Thomas Fink
(74) *Attorney, Agent, or Firm* — Meunier Carlin & Curfman LLC

(57) ABSTRACT

This invention concerns a contractile device. The device includes a body, which has a wall including a tessellation of elements. The body is deformable through pressurisation of fluid within the body between a first, extended state and a second, contracted state in which the axial length of the body is reduced and the internal volume increased compared to the first, normal state. The tessellation of elements includes a series of protruding and intruding formations which are arranged such that the body remains substantially cylindrical through its deformation between its normal and deformed states. The protruding and intruding formations of the tessellation of elements may be in the form of protruding and intruding pyramids.

22 Claims, 16 Drawing Sheets

(58) Field of Classification Search
USPC .................................................... 92/34–50
See application file for complete search history.

(56) References Cited

U.S. PATENT DOCUMENTS

| | | | |
|---|---|---|---|
| 2,238,058 A | 4/1941 | Johnson et al. | |
| 2,296,947 A | 9/1942 | Cartridge | |
| 2,483,088 A | 9/1949 | De Haven | |
| 2,534,123 A | 12/1950 | Hasselhorn | |
| 2,844,126 A | 7/1958 | Gaylord | |
| 3,469,502 A | 9/1969 | Gardner | |
| 4,464,980 A | 8/1984 | Yoshida | |
| 4,826,206 A * | 5/1989 | Immega | F16F 15/027 92/92 |
| 4,939,982 A * | 7/1990 | Immega | F15B 15/103 92/92 |
| 5,052,273 A | 10/1991 | Sakaguchi | |
| 5,165,323 A | 11/1992 | Sato | |
| 5,181,452 A * | 1/1993 | Immega | B25J 18/06 92/92 |
| 5,308,230 A | 5/1994 | Moore | |
| 5,317,952 A * | 6/1994 | Immega | F15B 15/10 901/22 |
| 5,529,293 A | 6/1996 | Haugs | |
| 6,349,746 B1 | 2/2002 | Bergemann et al. | |
| 9,506,481 B1 | 11/2016 | Theobald | |
| 9,541,196 B2 | 1/2017 | Henry et al. | |
| 9,624,911 B1 | 4/2017 | Griffith et al. | |
| 2005/0093293 A1 | 5/2005 | Schwartz et al. | |
| 2005/0265870 A1 | 12/2005 | Schantze et al. | |
| 2013/0340875 A1 | 12/2013 | Piacsek | |
| 2015/0070904 A1 | 3/2015 | Martinez et al. | |

FOREIGN PATENT DOCUMENTS

| | | |
|---|---|---|
| CN | 109129456 | 1/2019 |
| EP | 0161750 | 11/1985 |
| GB | 2390400 | 1/2004 |
| GB | 2435308 | 8/2007 |
| JP | 2012092956 | 5/2012 |
| JP | 3179088 | 10/2012 |
| WO | 2000/061951 | 10/2000 |
| WO | 2005/088138 | 9/2005 |
| WO | 2011/054394 | 5/2011 |

OTHER PUBLICATIONS

Baldwin H.—Muscle-like contractive devices, 1963. Bionics Symposium. pp. 1-8.

M. Mori, K. Suzumori, M. Takahashi, T. Hosoya—Very High Force Hydraulic McKibben Artificial Muscle with a p-Phenylene-2,6-benzobisoxazole Cord Sleeve, Advanced Robotics, vol. 24, Apr. 2010, pp. 233-254.

Shan, Ying, et al.—"Nonlinear-elastic finite axisymmetric deformation of flexible matrix composite membranes under internal pressure and axial force." Composites Science and Technology 66.15 (2006): 3053-3063.

Daerden, Frank, et al.—"Pleated pneumatic artificial muscles: actuators for automation and robotics." IEEE/ASME International Conference on Advanced Intelligent Mechatronics. vol. 2. 2001, 11 pages.

Tondu, Bertrand—"Artificial muscles for humanoid robots." Humanoid Robots, Human-like Machines. InTech, 2007, 36 pages.

Search & Examination Report issued for Application No. GB1908545. 5, dated Jun. 14, 2021.

International Search report and Written Opinion issued for Application No. PCT/GB2020/051445, dated Aug. 4, 2020.

International Preliminary Report on Patentability issued for Application No. PCT/GB2020/051445, dated Nov. 25, 2019.

Office Action, dated Mar. 16, 2023, issued for corresponding Chinese Patent Application No. CN202080057204.2.

* cited by examiner

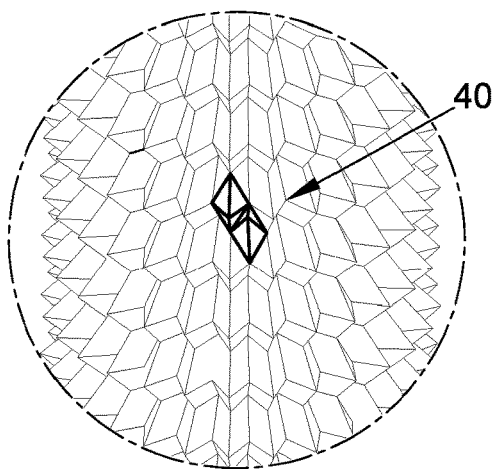
Fig.5
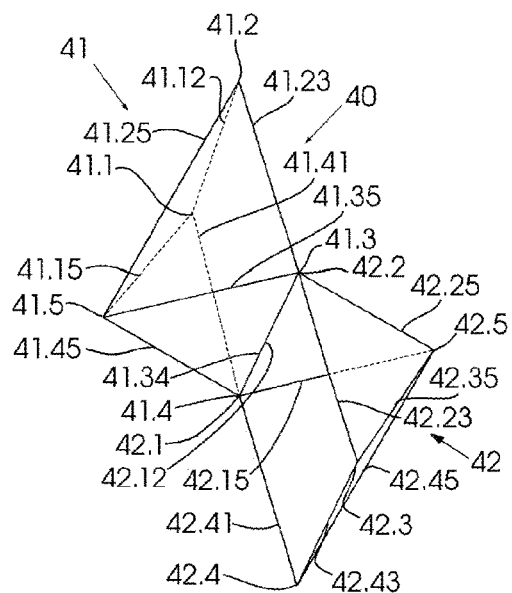
Fig. 6(a)
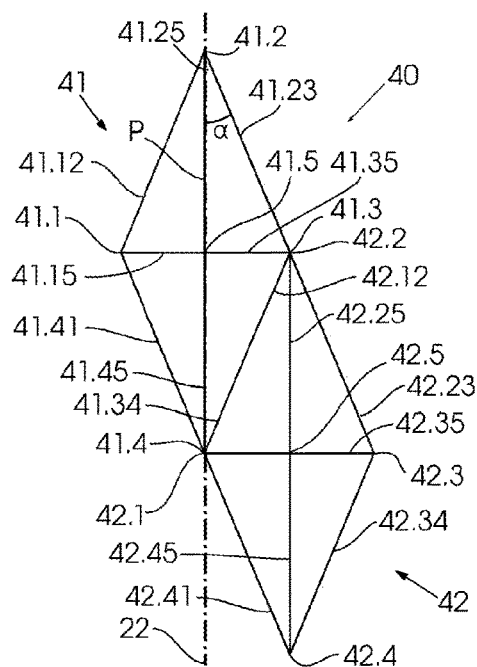
Fig. 6(b)
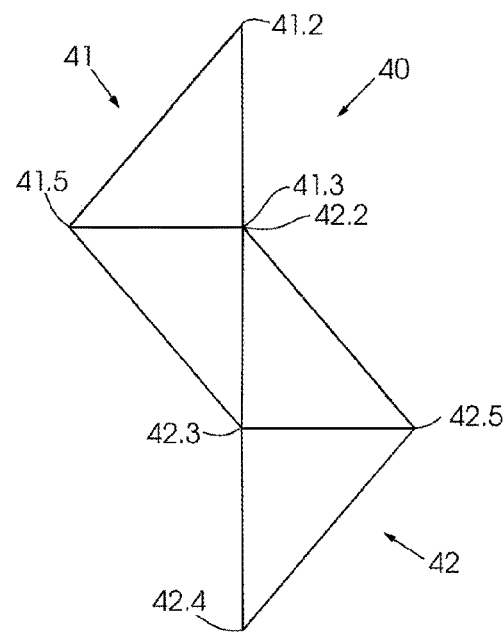
Fig. 6(c)
Fig. 6(d)
Fig.6

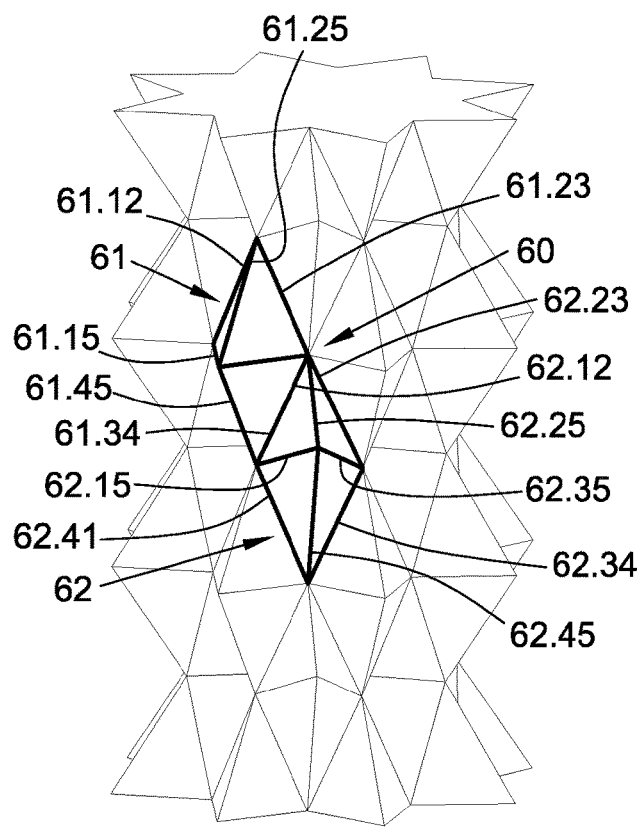
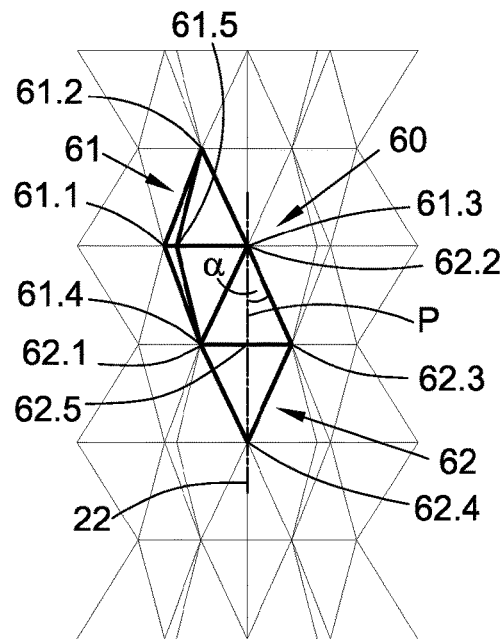
Fig.8(a)  Fig.8(b)
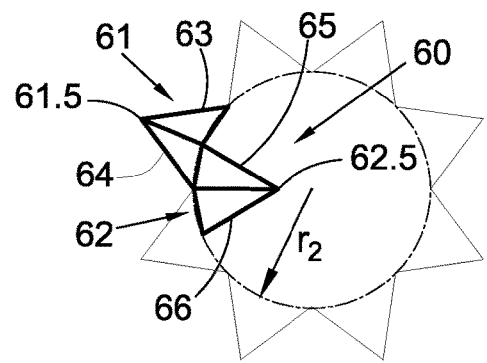
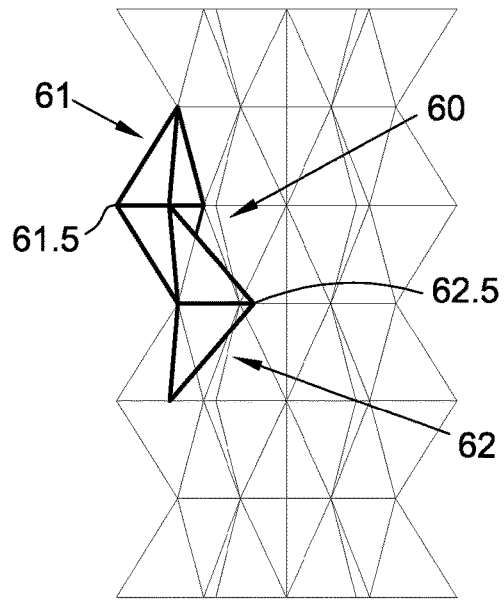
Fig.8(c)  Fig.8(d)

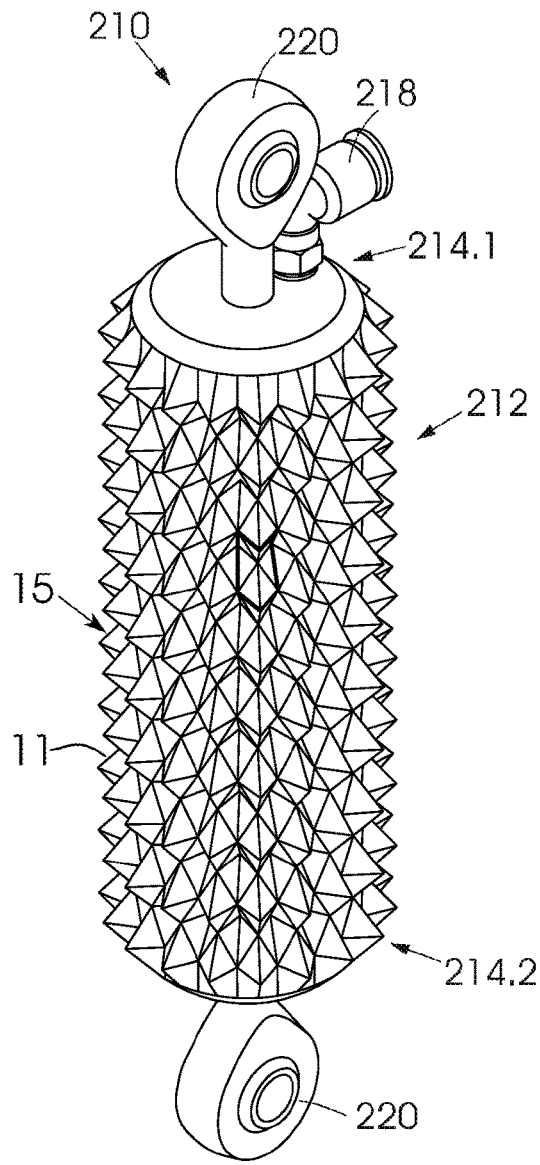
Fig. 13
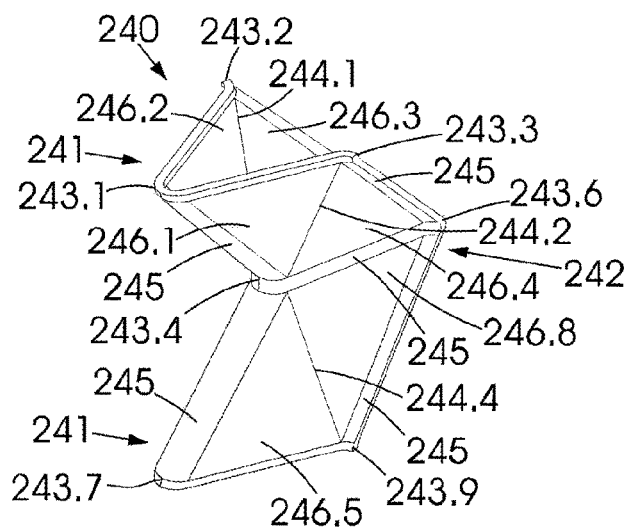
Fig. 14(a)
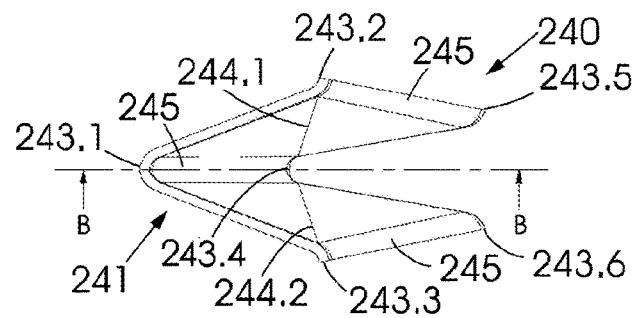
Fig. 14(b)
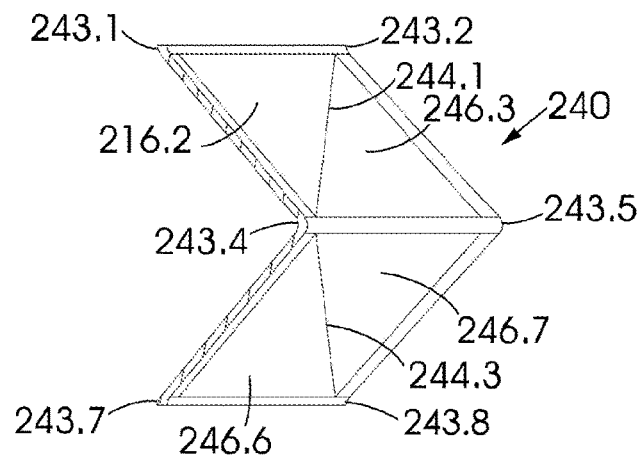
Fig. 14(c)
Fig. 14

CONTRACTILE DEVICE FOR USE AS AN ACTUATOR, PUMP OR COMPRESSOR

CROSS-REFERENCE TO RELATED APPLICATIONS

The present disclosure is the national phase under 35 U.S.C 371 of PCT/GB2020/051445 filed on Jun. 15, 2020, which claims priority to GB Patent Application No. 1908545.5, filed with on Jun. 14, 2019, both of which are incorporated herein by reference in their entireties.

BACKGROUND TO THE INVENTION

This invention relates to a contractile device and more particularly, but not exclusively, to a contractile device comprising a cylindrical pressurised form. The contractile device is typically a fluidic actuator, pump or compressor.

Fluidic actuators, pumps and compressors are devices that transduce between energy in the form of changes in pressurised fluid volume and energy in the form of mechanical force and displacement. Fluidic bellows and McKibben actuators are examples of such devices. Fluidic bellows are structures composed of substantially inextensible and fluid impermeable material, formed to facilitate small local deformations which result in large global displacement when the internal fluid pressure and volume is changed. Bellows type actuator, pump and compressor designs almost exclusively extend axially upon being subjected to positive internal fluid pressure. In contrast, McKibben actuators contract when subjected to positive actuating fluid pressure, but unlike a bellow their design must facilitate large local deformations. This requirement is accommodated through the use of both an inextensible but deformable helical weave and separate fluid containing material.

The small local deformations of bellows type designs allow for good manufacturing and material options, as well as the ability to withstand high working pressures. However, the need for the bellow to resist global buckling when actuating in extension (producing output force from internal pressure) or pumping in compressions (producing internal pressure from input force), limits their overall operating force without the addition of heavy bracing structures. In contrast, McKibben actuators contract when subjected to positive internal working pressure, resulting in external force that places the structure in tension, thereby eliminating the possibility of global buckling and leading to improved force to weight performance compared to extending devices. However, the complex composite design of McKibben devices reduces manufacturing and material options, increases device failure routes and limits operating pressure. While there are other deformable contractile actuators, only the McKibben (or those very similar) maintain a cylindrical, as opposed to spherical/ballooning, shape when pressurized. This means McKibben devices can be manufactured with desirable aspects ratios, which maintain an efficient use of space when actuated.

As mentioned above, fluidic bellows allow for global displacements to be achieved with limited local material deformation. This is generally achieved through forms that facilitate local bending of solid hinge like regions. The combined result of a number of bending hinges can be a large overall deformation. Examples of a typical bellows actuator can be seen in U.S. Pat. No. 3,469,502. In the device, by increasing the pressure of the fluid contained within the bellows it extends axially with respect to the cylindrical form of the device. A typical bellows pump or compressor is similar, for example see U.S. Pat. No. 5,308,230. In this device a tensile force is applied to the bellows increasing the contained fluid volume, upon reversal of this force the contained fluid is compressed. Bellow designs of different cross sections have also been proposed. For example, see US 2013/0340875 which discloses a square cross-section or U.S. Pat. No. 5,181,452 which discloses a star shaped cross-section.

Since bellows actuators do not use the sliding seals of conventional cylinder or piston based fluidic actuators they are much simpler in construction, more suited to operating in harsh environments, can handle corrosive operating fluids, and can have improved reliability with reduced weight. In addition, since limited material deformation is required for operation, they can be manufactured from a range of low-cost substantially rigid materials with accompanying beneficial manufacturing processes and high strength. For example, U.S. Pat. No. 4,464,980 discloses a blow-moulded bellows of a thermoplastic elastomeric material. U.S. Pat. No. 9,624,911 discloses a bellows formed using a mass manufacturing technique such as blow moulding, injection moulding, rotational moulding, 3-Dimensional (3D) printing, or extrusion. Griffith et al specifically teaches the use of polymer polyethylene terephthalate (PET) in the manufacture of bellows. A known method for making metal bellows is described in U.S. Pat. No. 2,534,123 while US 2015/0070904 describes a variety of forms of a fabric-elastomer composite bellows actuator.

One issue with the known bellows type designs described above is that upon pressurisation of the internal fluid they extend axially, meaning they are placed in compression if doing work against a load (or if load is doing work against the fluid in the pump/compressor case), thereby causing buckling and failure of devices with significant aspect ratios of length to diameter. In actuators this can be overcome be creating a vacuum within the bellows instead of pressurising it as suggested by Jin-Gyu Lee and Hugo Rodrigue, *Origami-Based Vacuum Pneumatic Artificial Muscles with Large Contraction Ratios*, Soft Robotics, February 2019, http://doi.org/10.1089/soro.2018.0063. In this instance the device will contract with the material being placed in tension when working against a load, which effectively prevents the device from buckling globally. However, the maximum operating pressure that can deform a vacuum bellows is limited to one atmosphere (about 1 bar). This is particularly problematic considering that typical pneumatic systems operate at around 6 bar, while modern high-performance hydraulic system operate at almost 350 bar.

In an attempt to overcome the restriction of buckling of extending bellows type actuators, much attention has been paid to developing contractile devices that provide a tensile force, the largest family of which is generally referred to as McKibben actuators. These actuators typically comprise a fluid-containing cylindrical membrane able to deform under pressure and a helical weave of inextensible material, either external to, or incorporated into the deformable membrane. This concept can be traced back to U.S. Pat. Nos. 2,041,950, 2,296,947 and 2,238,058, and similar devices described in U.S. Pat. Nos. 2,483,088 and 2,844,126. However, the device was popularised by Joseph McKibben in the 1950's for use in orthotic devices as described in Baldwin, H, *Muscle-like contractive devices*, 1963. Bionics Symposium. pp. 1-8. Bridgestone developed a commercial version of the pneumatic muscle called a Rubbertuator™, which is described in EP 0 161 750 B1 and U.S. Pat. No. 5,052,273. U.S. Pat. No. 5,165,323 describes a notable improvement to the device by adding a rigid sliding cylindrical sleeve inside the actuator, whereby the cavity between the sleeve and standard membrane is pressurised. Standard McKibben style devices are described in GB 2 390 400 and U.S. Pat. No. 9,541,196, for example. The devices described in these specifications tend to have inextensible braid separated from the fluid impermeable membrane, which leads to braid rubbing and potential failure. The membrane is generally an elastic material and the deformation results in energy losses and hysteresis in performance, as well as being prone to failure. In order to improve resistance to failure it was suggested in GB 2 435 308 to make use of a fixed perimeter, inextensible bladder. However, owing to strength issues no such devices have been operated at a pressure above 40 bar [M. Mori, K. Suzumori, M. Takahashi, T. Hosoya, *Very High Force Hydraulic McKibben Artificial Muscle with a p-Phe-nylene-2,6-benzobisoxazole Cord Sleeve*, Advanced Robotics, vol 24, April 2010, pp 233-254.]. As a result, these devices are typically operated as pneumatic devices.

More robust configurations of McKibben type devices have been produced by incorporating the braid within the membrane material as a flexible matrix composite as described in U.S. Pat. No. 6,349,746, WO 2000/061951, US 2005/0093293 and US 2005/0265870. While these devices are more robust, they are still limited to operating pressures of around 6 to 8 bar. The composite materials used in these devices have the additional drawback of adding to the complexity and cost of manufacture. Similar devices have also been explored in academia, for example see Shan, Ying, et al. "*Nonlinear-elastic finite axisymmetric deformation of flexible matrix composite membranes under internal pressure and axial force.*" Composites Science and Technology 66.15 (2006): 3053-3063.

What is required to improve the field of fluidic actuators and bellows pumps and compressors is a device that shares the material and manufacturing choices and resulting cost and strength benefits of bellows type devices with the contractile displacement and resulting force benefits of the McKibben type devices. There are two examples of actuators approaching this, although both do not appear to have been realized with more rigid materials. The first device is the pleated actuator described in Daerden, Frank, et al. "*Pleated pneumatic artificial muscles: actuators for automation and robotics.*" IEEE/ASME International Conference on Advanced Intelligent Mechatronics. Vol. 2. 2001 and depicted in the specifications of US 2015/0070904. The second device is disclosed in U.S. Pat. No. 4,939,982. A key difference between both these examples and the McKibben actuator is the overall shape of the devices when actuated. While the McKibben will remain in a cylindrical form (when significantly removed from the influence of clamped ends) these other contractile forms result in roughly spherical geometries. This imposes a practical aspect ratio limit on them (they must be relatively short and wide), which means that the force generated as a ratio of the actuated cross-sectional area is less than McKibben devices [Tondu, Bertrand. "*Artificial muscles for humanoid robots.*" Humanoid Robots, Human-like Machines. InTech, 2007]. These factors may indicate why only the McKibben type actuators have been commercialised to date.

In view of the above, there is a requirement to deliver an improved fluidic actuator or pump/compressor that is a contractile bellows that replicates the functionality of the McKibben devices and its derivatives such as the sleeve core McKibben device described in U.S. Pat. No. 5,165,323.

It is accordingly an object of the invention to provide a device that will, at least partially, address the above disadvantages.

It is also an object of the invention to provide a device which will be a useful alternative to existing bellows and McKibben type devices.

SUMMARY OF THE INVENTION

According to the invention there is provided a contractile device comprising a central axis, an internal volume, radius $r_2$ perpendicular to said central axis and a body having a wall including a tessellation of elements, wherein the body may be deformable through pressurisation of fluid within the body between a first, normal state having a first axial length L1 and a first internal volume V1 and a second, deformed state having a second axial length L2 and a second internal volume V2 in which the second axial length L2 of the body maybe reduced and the second volume V2 maybe increased compared to the first axial length L1 and first internal volume V1 of the first, normal state. The tessellation of elements may include a series of protruding formations and intruding formations which may be arranged such that the body remains substantially cylindrical through its deformation between its normal and deformed states.

According to a second aspect of the invention a contractile device may comprise a body having a central axis, an internal volume V, a radius $r_2$ perpendicular to said central axis 22 and a wall including a tessellation of elements. The body may be deformable through extension of the body between a second, normal state having a second axial length L2 and a second internal volume V2 and a first, deformed state having a first axial length L1 and a first internal volume V1 in which the second axial length L2 of the body 12 may be reduced and the second volume V2 may be increased compared to the first axial length L1 and first internal volume V1 of the first, normal state. The tessellation of elements may include a series of protruding formations and intruding formations which are arranged such that the body remains substantially cylindrical through its deformation between its normal and deformed states.

According to a further aspect of the invention a contractile device may comprise a body having a central axis, an internal volume V, a radius $r_2$ perpendicular to said central axis and a wall including a tessellation of elements. The body maybe axially deformable along the central axis between first state with a first axial length L1 having a first internal volume V1 and a second state with a second axial length L2 having a second internal volume V2, in which the second axial length L2 of the body is reduced and the second volume V2 increased compared to the first axial length L1 and first internal volume V1. The tessellation of elements may include a series of protruding formations and intruding formations which may be arranged such that the body remains substantially cylindrical through its deformation between the first axial length and the second axial length.

Radius $r_2$ is perpendicular to the central axis and may vary along the length of the central axis. $r_2$ describes a substantially cylindrical profile along the length of the body of the actuator. Protruding formations may extend radially away from the central axis and may extend radially from the cylindrical radius $r_2$ radially away from the central axis. Intruding formations may extend radially toward the central axis and may extend radially from the cylindrical radius r2 toward the central axis.

The tessellation of elements of the may include elements comprising intruding and protruding formations wherein said elements may fit together, repeating without gaps or overlapping. The protruding and intruding formations may include base nodes. Said base nodes may be positioned a radius $r_2$ from the central axis. Base nodes of a protruding formation may be coincident with base nodes of an intruding formation. The protruding and intruding formations may include base edges. Said base edges may be positioned a radius $r_2$ from the central axis. Base edges of a protruding formation may be coincident with base edges of an intruding formation.

The protruding and intruding formations of the tessellation of elements may include or be in the form of protruding and intruding pyramids, preferably quadrilateral and/or hexagonal pyramids.

In one embodiment the protruding pyramids may be in the form of quadrilateral pyramids, preferably truncated quadrilateral pyramids, and the intruding pyramids may be in the form of hexagonal pyramids. The protruding formations including quadrilateral pyramids and the intruding formations including hexagonal pyramids may be formed by including a wedge-shape formation in each pyramid. The orientation of the wedge-shaped formations included in the quadrilateral and hexagonal pyramids respectively may be reversed relative to the respective pyramid so as to form the truncated quadrilateral protruding pyramid and the hexagonal intruding pyramid. The wedge may be formed from the axial cross section of the pyramid with the narrow end proximal the central axis and the wide end distal the central axis.

The contractile device in its first state may define an angle $\alpha$ between said base edges of the protruding formations and intruding formations and the central axis 22. More specifically between a plane P, defined by the central axis and a node of the base edge, and the base edge. The angle $\alpha$ maybe less than 55 degrees. Alternatively, the angle $\alpha$ may be between 25 and 30 degrees.

The contractile device may be an elastic member. The body of the device may possess a stiffness k in the direction of the central axis that acts to return the body from the second deformed state to the first normal state.

The device may include means for reducing stress concentrations at the vertices of the tessellation of elements. The means for reducing stress concentrations may include stress reducing formations located in the regions of the vertices that reduce or eliminate the Gaussian curvature at the vertices.

The stress reducing formations located in the regions of the vertices may be in the form of holes. Alternatively, the stress reducing formations located in the regions of the vertices may be in the form of cones, pyramids or the like that are inverted relative to the underlying vertex geometry. In yet another embodiment the stress reducing formations located in the regions of the vertices may be in the form of flat and/or curved sections relative to the underlying vertex geometry.

The protruding and intruding formations may include edges running between its vertices and the edges may be filleted in order to reduce stress concentrations in the regions of the edges. The protruding and intruding formations may include means for reducing in-plane stretching and out-of-plane bending of the faces extending between their edges.

The regions of the faces of the protruding and intruding formations may be manufactured from a material that has an increased stiffness compared to the material in the regions of the vertices and edges of the protruding and intruding formations.

The regions of the faces of the protruding and intruding formations may have an increased wall thickness compared to the regions of the protruding and intruding formations in the edges and vertices. The increased wall thickness may be created by external and/or internal protrusions carried by the faces of the protruding and intruding formations.

The body of the device may include a second, internal wall defined by a second structure located within the first structure defining the wall carrying the tessellation of elements, wherein the space between the first and second walls define a first volume in which an operating fluid is receivable, and wherein the internal space within second wall defines a second volume which is independent from the first volume.

The structure defining the second wall is preferably an auxetic structure. The structure defining the second wall may be a bellows type structure or a re-entrant structure.

The wall carrying the tessellation of elements preferably comprises a single material, i.e. a material free from reinforcement. The wall carrying the tessellation of elements may be manufactured using additive manufacturing, thermoforming, forging and stamping, or composite manufacturing processes.

The wall carrying the tessellation of elements may be manufactured from any material selected from the group comprising thermo-polymers Acetal (Delrin®), Nylon, acrylonitrile butadiene styrene (ABS), polyethylene terephthalate glycol (PETG), polyethylene terephthalate (PET), thermoplastic polyurethanes (TPU), Polyethylene (high density PE (HDPE), low density PE (LDPE), linear low density PE (LLDPE), ultra-high molecular weight PE (UHMWPE)), poly vinyl chloride (PVC), polyetheretherketone (PEEK), polyphenylene sulfide (PPS), Polystyrene, Polysulfone, polybutylene terephthalate (PBT), polytetrafluoroethylene (PTFE), polyvinylidene fluoride (PVDF), Polycarbonate and Polypropylene (Homopolymer and Copolymer).

Alternatively, the wall carrying the tessellation of elements may be manufactured from any thermoset plastics material, preferably selected from the group comprising epoxy, polyimide, polyurethane, silicone, vinyl and natural rubbers.

Alternatively, the wall carrying the tessellation of elements may be manufactured from a super-elastic alloy.

Alternatively, the wall carrying the tessellation of elements may be manufactured from a composite material using fibres of Glass (E, AR and S glass), carbon that may be high modulus (HM) and/or high strength (HS), Boron, polyamide (Kevlar®, Twaron®), polyester (Vectron®), Polybenzoxazole (PBO, Zylon®), Polybenzothiazoles (PBT), Polybenzimidazole (PBI) or Ultra-High Molecular Weight Polyethylene (Dyneama®).

In a further embodiment a valve may be moved by the contractile device. In such an embodiment the contractile device may be an elastic member that causes the valve to fail open or closed.

BRIEF DESCRIPTION OF THE DRAWINGS

The invention will now be described in more detail, by way of example only, with reference to the accompanying drawings in which:

FIG. 5 shows an enlarged view of a portion of the wall of the device of FIG. 1 in which a single protruding pyramid and a single intruding pyramid making up an element of the tessellation of elements are highlighted;

FIG. 6 shows a first, theoretically ideal embodiment of an element of the tessellation of the device of FIG. 1 in which a perspective view, front view, top view and side view are shown in an extended state in FIGS. 6(a) to 6(d) respectively;

FIG. 13 shows a perspective view of a third embodiment of a contractile device in accordance with the invention in which the device is shown as an actuator in its unactuated, extended state, wherein a single rectangular tessellating unit is highlighted;

FIG. 14 shows an embodiment of the tessellation element of the device of FIG. 13, wherein a perspective view, top view and cross-sectional view taken along B-B are shown in FIGS. 14(a) to 14(c) respectively;

SPECIFIC DESCRIPTION

Figure 1:
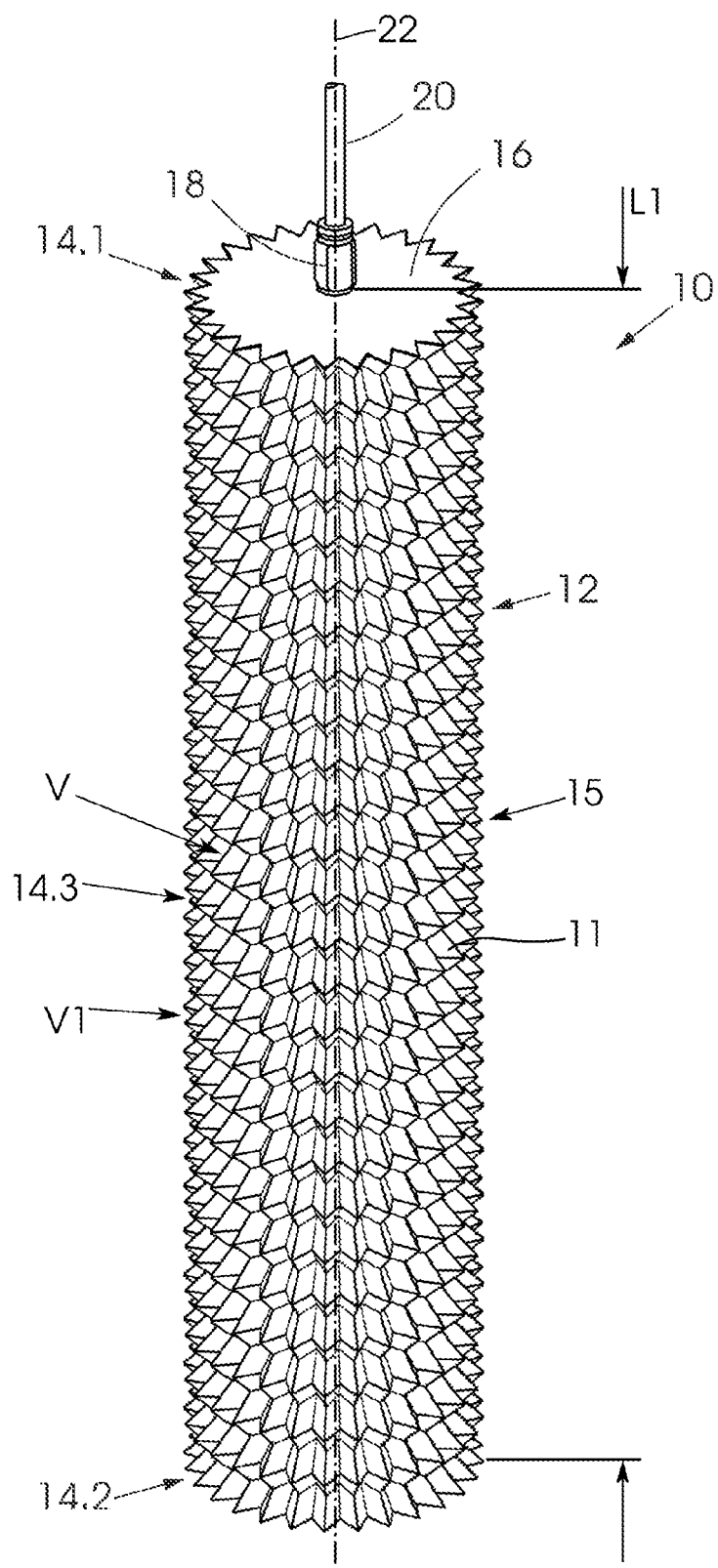
FIG. 1 shows a perspective view of a first embodiment of a contractile device in accordance with the invention in which the device is shown as an actuator in its unactuated, extended state wherein the internal fluid pressure is equal to the external pressure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Therefore, any combination of features described in the individual embodiments or figures is included in the invention even if not explicitly disclosed herein. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings and are thus intended to include direct connections between two members without any other members interposed therebetween and indirect connections between members in which one or more other members are interposed therebetween. Further, "connected" and "coupled" are not restricted to physical or mechanical connections or couplings. Additionally, the words "lower", "upper", "upward", "down" and "downward" designate directions in the drawings to which reference is made. The terminology includes the words specifically mentioned above, derivatives thereof, and words or similar import. It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

The invention is capable of replacing linear actuators or pistons in many situations. Especially, the invention is suited for use for actuating valves and in particular is suitable for use as a fail closed or fail open valve actuator.

Referring to the drawings, in which like numerals indicate like features, a non-limiting example of a first embodiment of a device in accordance with the invention is generally indicated by reference numeral 10.

Figure 2:
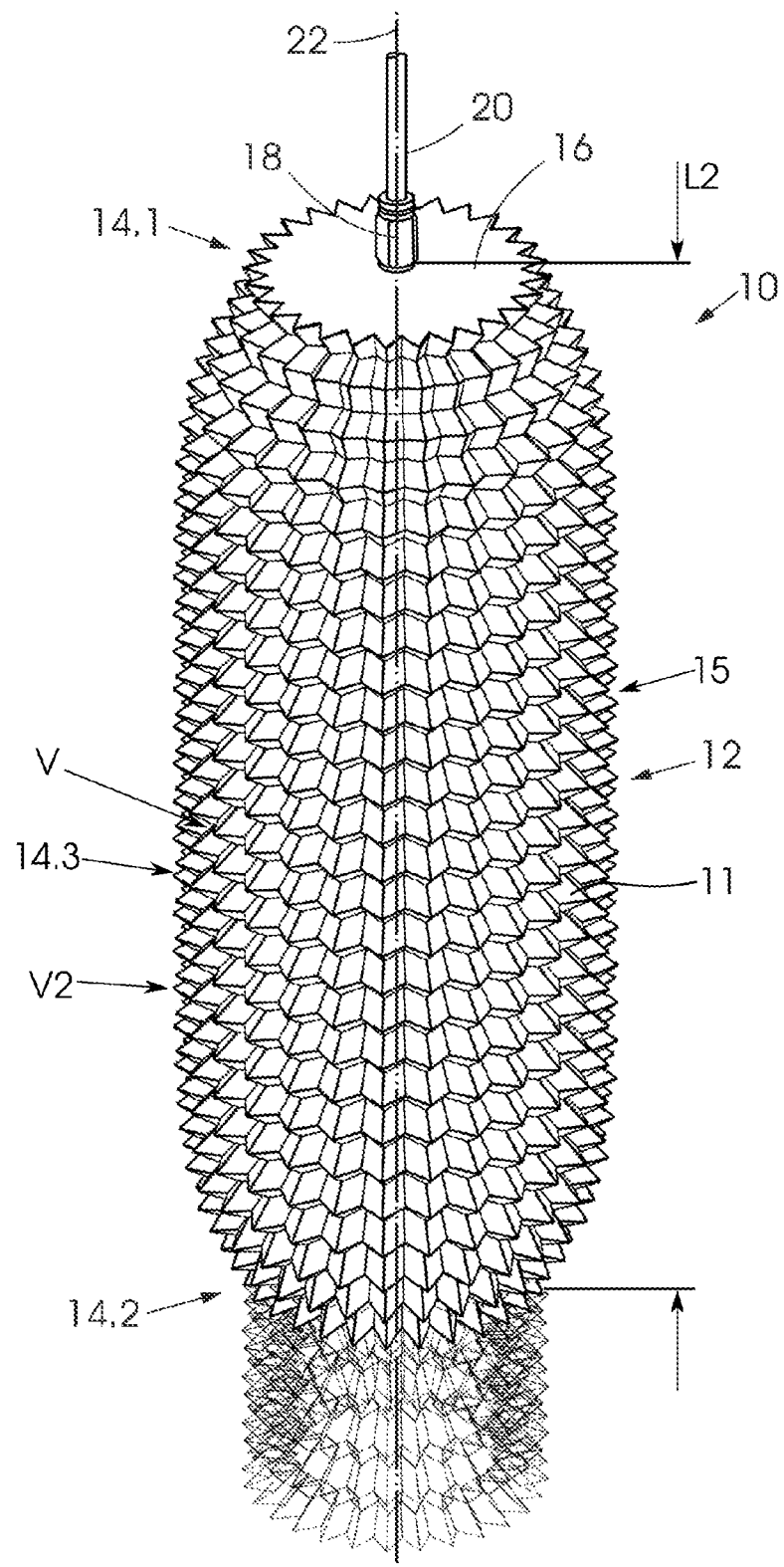
FIG. 2 shows a perspective view of the device of FIG. 1 in its actuated or contracted state wherein the internal fluid pressure greater than the external pressure.

In the first embodiment of the invention the device 10 is in the form of a bellows type device, which may be operable between a first, normal, extended state, having a first axial length L1, a first pressure P1 and a first internal volume V1, as shown in FIG. 1 and a second, contracted, deformed state, having a second axial length L2, a second pressure P2 and a second, internal volume V2 as shown in FIG. 2. The device 10 may have a substantially cylindrical body 12 extending along a central axis 22 between two longitudinally opposite ends, a first end 14.1 and a second end 14.2 respectively. The ends 14.1, 14.2 each carries an end cap or fitting 16 which provides for attachment to other components. As shown in FIGS. 1 and 2, the end cap 16 located at the end 14.1 carries means for conveying fluid into and/or out of the internal volume (V) of the body 12. The means for conveying fluid may include a valve 18 to which a conduit 20 is connected. In use, the conduit 20 is in fluid communication with a fluid source, such as a reservoir for example, such that fluid may be conveyed into and out of the internal volume (V) of the body 12. The body 12 is substantially impermeable such that the fluid can be retained in its internal volume (V). In this particular embodiment the body 12 is made from an impermeable material. However, it is envisaged that in an alternative embodiment the body 12 may carry an impermeable liner, for example.

Returning to the illustrated embodiments of FIGS. 1 and 2, the body 12 may be manufactured from an inextensible material such that, in use, when the fluid is delivered into the internal volume V of the body 12 or the fluid pressure P inside the internal volume V is increased, the device 10 and in particular the body 12 contracts. In other words, the device 10 and in particular the body 12 contracts when moving from its first, normal state into its second, deformed state, the first axial length L1 maybe longer than the second axial length L2, the first pressure P1 maybe lower than the second pressure P2 and/or the first internal volume V2 maybe lower than the second internal volume V2. The contraction is clearly visible in FIGS. 1 and 2. The device 10 is also therefore referred to as a contractile device.

In an application wherein the device 10 is configured as an actuator, it will produce a contractile movement and/or a tensile force acting in a direction substantially in line with the longitudinal centre axis 22 of the cylindrical body 12. As illustrated in FIG. 2, this work action is facilitated by the radial expansion of the bellows type body 12 and the resulting overall increase in fluid volume contained in the internal volume V of the body 12. However, unlike known contractile bellow type devices the device 10 of the invention maintains a substantially cylindrical form when actuated. Referring to FIG. 2, the body 12 of the device 10 remains cylindrical over a major portion of its length when in its deformed state, wherein the major portion of its length may comprise a central portion 14.3 extending from proximal the first end 14.1 to proximal the second end 14.2. Only in the end regions in close proximity to the rigid end caps 16 may the body 12 not retain its cylindrical form.

Figure 3:
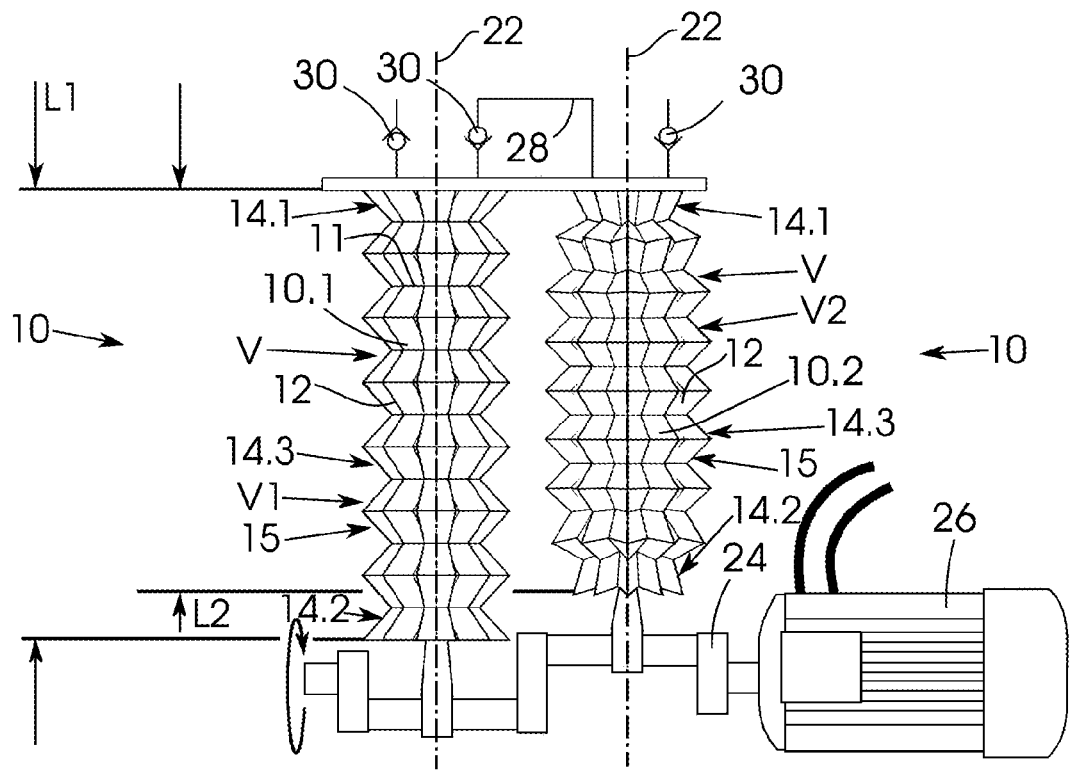
FIG. 3 shows the device of FIG. 1 used in a two-stage pump or compressor arrangement with the arrangement shown in its first half of the operating cycle.
Figure 4:
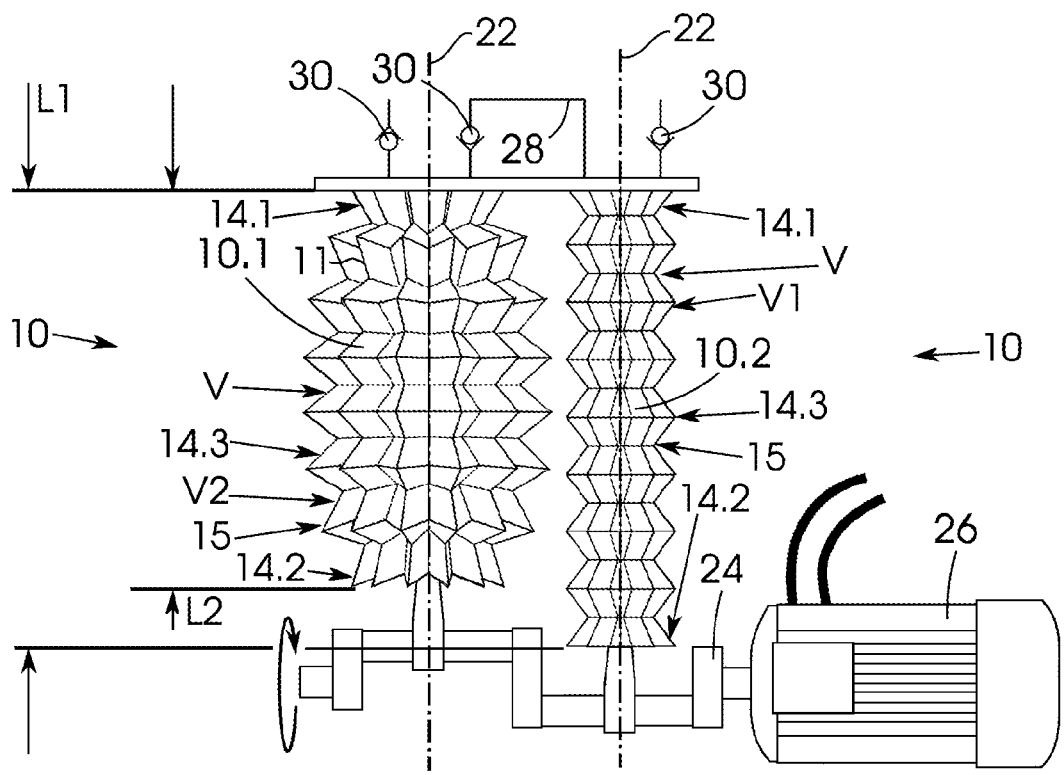
FIG. 4 shows the two-stage pump or compressor arrangement of FIG. 3 with the arrangement shown in its second half of the operating cycle.

FIGS. 3 and 4 illustrate a second embodiment, showing an application in which the device 10 is used as a pump or compressor. In this particular application it may be desirable to configure the device 10 such that the body 12 is contracted in its second, normal state having second axial length L2 and second internal volume V2 and then deformed into an extended, first state having a first axial length L1 and first internal volume V1. When used in this pump or compressor application shown in FIG. 3, the application of a tensile axial load, for example by means of mechanism such as a crankshaft 24 driven by an electrical motor 26 for example, results in radial contraction, axial extension from axial length L2 to axial length L1 and overall reduction in fluid volume and/or increase in fluid pressure. This deformation as a result of a tensile load is illustrated in FIGS. 3 and 4. In these drawings a two-stage arrangement is illustrated in which two devices 10 are used. The devices are mounted next to one another and indicated by the reference signs 10.1 and 10.2 respectively. It is however envisaged that a multi-stage arrangement could be used in which a number of devices are used. The invention is therefore not limited to any particular number of devices 10 used. In a typical two- or multi-stage arrangement the devices 10 are in fluid communication with one another using conduits 28 carrying non-return or check valves 30. In such an application, devices 10 of successively decreasing volume will typically be used.

The actuating device 10 of the invention is capable of contracting up to about 35% of its undeformed or extended length. In other words, the axial length of the body 12 is about 35% shorter in its deformed or contracted state than its normal state. As a result in the first embodiment, when pressurised, with the starting length of a high-strain configuration, and held fixed, the device 10 can produce a normalized force over the cross-sectional area of the body equivalent to five times the input fluid pressure when compared to a standard piston actuator. The mechanical work output can be approximated as the product of the change in internal fluid volume and the pressure of this fluid.

In order to achieve the desired deformability of the device 10, the wall 11 of the bellows type body 12 comprises a tessellation of elements 15. These elements are shown in greater detail, in the first extended state in, FIGS. 5 and 6(a) to (d). In this illustrated embodiment of the device 10 a first embodiment of the elements comprises protruding formations 41 and intruding formations 42, each having a pyramidal structure, that includes protruding and intruding quadrilateral pyramids respectively. In FIG. 5 a single unit or element 40 of the tessellation is highlighted. FIG. 6(a) to (d) shows the element 40 in greater detail.

The element 40 illustrated in FIG. 6(a) to (d) is the theoretically ideal element to form the tessellation as it is constructed on a flat plane, i.e. as if used on a cylinder with infinite radius $r_1$. The protruding formation or pyramid 41 may comprise base nodes 41.1, 41.2, 41.3 and 41.4 with base edges 41.12, 41.23, 41.34 and 41.41 extending therebetween, and a central vertex 41.5. Axial edges 41.25 and 41.45 extend between central vertex 41.5 and base nodes 41.2 and 41.4 respectively and circumferential edges 41.15 and 41.35 extend between central vertex 41.5 and base nodes 41.1 and 41.3 respectively. The base nodes 41.1 and 41.2 defining the first and second ends of base edge 41.12, base nodes 41.2 and 41.3 defining the first and second ends of base edge 41.23, base nodes 41.3 and 41.4 defining the first and second ends of base edge 41.34 and base nodes 41.4 and 41.1 defining the first and second ends of base edge 41.41.

Similarly, the intruding formation or pyramid 42 may comprise base nodes 42.1, 42.2, 42.3 and 42.4 with base edges 42.12, 42.23, 42.34 and 42.41 extending therebetween, and a central vertex 42.5. Axial edges 42.25 and 42.45 extend between central vertex 42.5 and base nodes 42.2 and 42.4 respectively and circumferential edges 42.15 and 42.35 extend between central vertex 42.5 and base nodes 42.1 and 42.3 respectively. The base nodes 42.1 and 42.2 defining the first and second ends of base edge 42.12, base nodes 42.2 and 42.3 defining the first and second ends of base edge 42.23, base nodes 42.3 and 42.4 defining the first and second ends of base edge 42.34 and base nodes 42.4 and 42.1 defining the first and second ends of base edge 42.41.

The nodes 41.3 and 41.4 may coincide with nodes 42.2 and 42.1 respectively. Therefore, the base edge 41.34 of the protruding formation 41 may coincide with the base edge 42.12 of the intruding formation 42. The element 40 repeats to form the tessellation of elements 15 of the body 12 therefore the other base edges 41.12, 41.23, 41.41, 42.23, 42.34, 42.41 and nodes 41.1, 41.2, 42.3, 42.4 of the intruding formations 42 and the protruding formations 41 are coincident with the respective base edges and nodes of their adjacent intruding and protruding formations.

The FIG. 6(*b*) shows the device in the longitudinally extended state. The angle α illustrated in FIG. 6(*b*) is important and has a significant influence on the resulting deformation of the body 12 from the first extended state when pressurised. In this particular embodiment of the device 10 the angle α has to be less than 55° for any contraction of the body 12 to take place. It has further been determined that the largest deformation is achieved when the angle α is in the range of about 25° to 30°.

The angle α is formed when the actuator is in the first extended state, with axial length L1, between the base edges 41.12, 41.23, 41.34, 41.41, 42.12, 42.23, 42.34 and 42.41 of the protruding formations 41 or intruding formations 42 and the central axis 22, when the protruding formations are in front or plan view as in FIG. 6*b*. Specifically the angle α is formed between the respective base edges 41.12, 41.23, 41.34, 41.41, 42.12, 42.23, 42.34 and 42.41, that join the nodes of the axial edges 41.25, 41.45, 42.25 and 42.45 and circumferential edges 41.15, 41.35, 42.15 and 42.35 of the respective formations 41, 42, and a plane P defined by the central axis 22 and a node 41.2, 41.4, 42.2, 42.4 of the base edge. The angle α maybe less than 55 degrees. Alternatively, the angle α may be between 25 and 30 degrees.

Formations or pyramids 51, 52 at the same axial location within the body 12 should have identical, or at least near identical geometry. However, this is not achievable on a real cylinder with a finite radius $r_2$ from the central axis 22. Instead, this condition can be approximated, and a second embodiment of the element used in the tessellation of elements 15 is shown in FIG. 7(*a*) to (*h*) and is indicated by the reference sign 50. The element 50 again has a protruding pyramid 51 and an intruding pyramid 52. The pyramid 51 again has a base comprising base nodes 51.1 to 51.4, respective base edges 51.12, 51.23, 51.34 and 51.41 extending therebetween and a vertex 51.5 while the pyramid 52 has a base comprising base nodes 52.1 to 52.4, respective base edges 52.12, 52.23, 52.34 and 52.41 extending therebetween and a vertex 52.5. In the element 50 the vertices 51.5 and 52.5 of the protruding 51 and intruding 52 pyramids respectively are offset equally from the cylindrical radius $r_2$ such that axial edges 53, 54, 55 and 56 are all of equal length. This maintains geometry close to the ideal (infinite cylinder radius $r_1$ case of element 40 above) where all deformation occurs through easy hinge bending, instead of difficult membrane stretching. Again, base nodes 51.3 and 51.4 coincide with base nodes 52.2 and 52.1 respectively. Therefore, the base edge of the protruding pyramid 51.34 coincides with the base edge 52.12.

A third embodiment of the element used in the tessellation is shown FIG. 8(*a*) to (*h*) and indicated by the reference sign 60. Again, the element 60 has a protruding pyramid 61 and an intruding pyramid 62. The pyramid 61 again has a base comprising base nodes 61.1 to 61.4, respective base edges 61.12, 61.23, 61.34 and 61.41 extending therebetween and a vertex 61.5 while the pyramid 62 has a base comprising base nodes 62.1 to 62.4, respective base edges 62.12, 62.23, 62.34 and 62.41 extending therebetween and a vertex 62.5. In this embodiment of the element 60 the condition of equal vertex offset from the radius as in the case of the second embodiment of the element 50 is relaxed. Instead, the length of the circumferential edges 63, 64, 65 and 66 are all equal. This maintains geometry close to the ideal (infinite cylinder radius $r_1$ case of element 40 above) where all deformation occurs through easy hinge bending, instead of difficult membrane stretching. Again, base nodes 61.3 and 61.4 coincide with nodes 62.2 and 62.1 respectively. Therefore, the base edge of the protruding pyramid 61.34 coincides with the base edge 62.12.

In embodiments two, three and four of the elements $r_2$ is perpendicular to the central axis 22 and may define the cylindrical radius of the real cylinder at any point along its axial length L. The value of $r_2$ may vary along said axial length L and increase or decrease with deformation of the element. Specifically, $r_2$ may decrease towards the ends of the element.

Figure 7A:
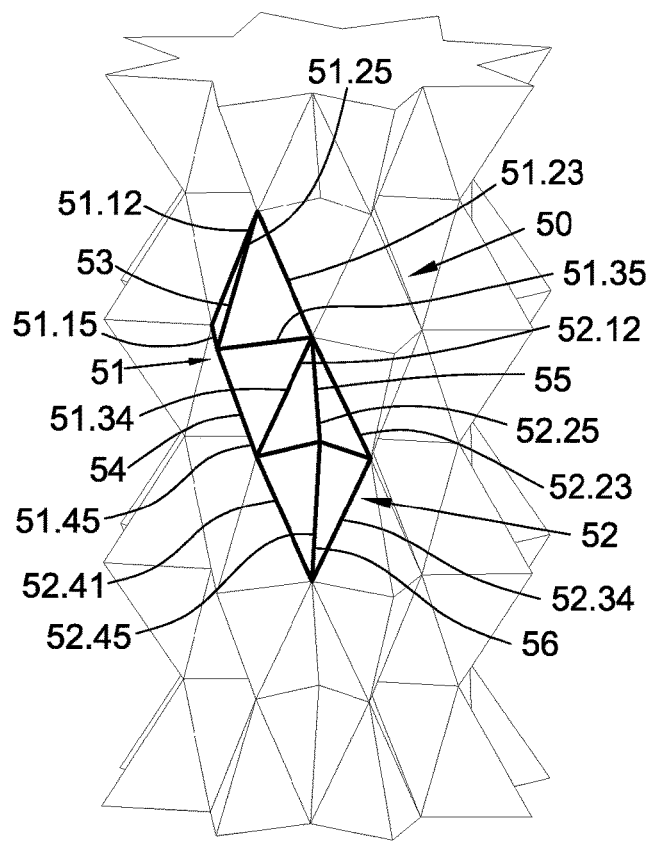
FIG. 7 shows a second embodiment of an element of the tessellation of elements of the device of FIG. 1 in which a perspective view, front view, top view and side view are shown in an extended state in FIGS. 7(a) to 7(d) respectively, with the corresponding contracted states shown in FIGS. 7(e) to 7(h) respectively.
Figure 7B:
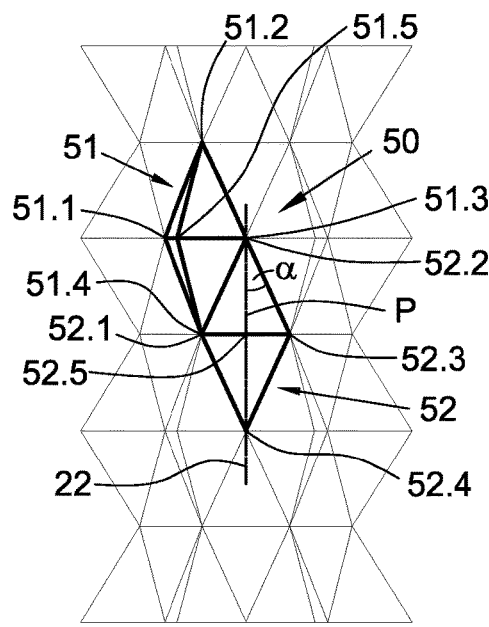
Figure 7C:
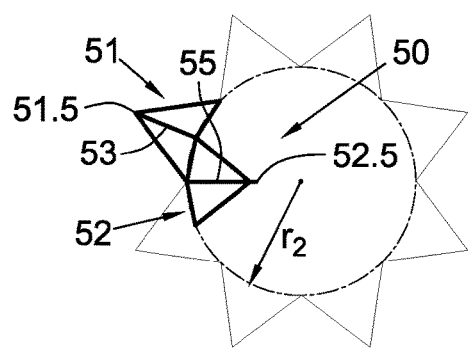
Figure 7D:
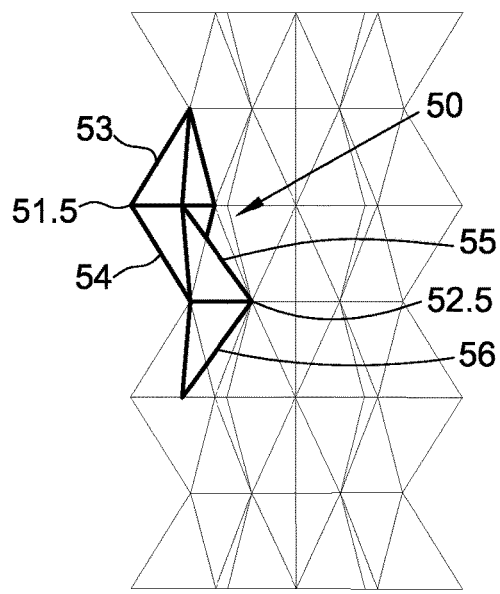
Figure 7E:
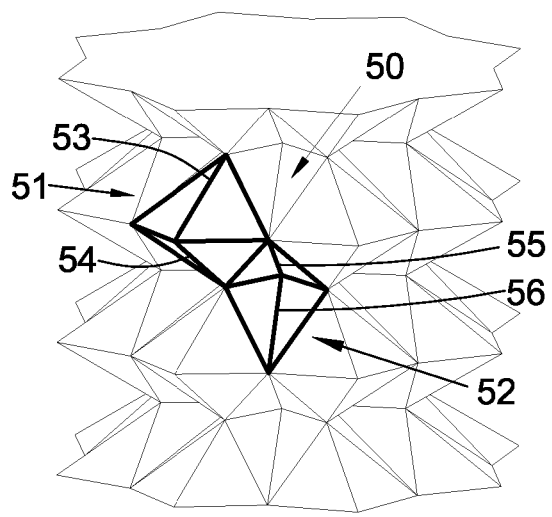
Figure 7F:
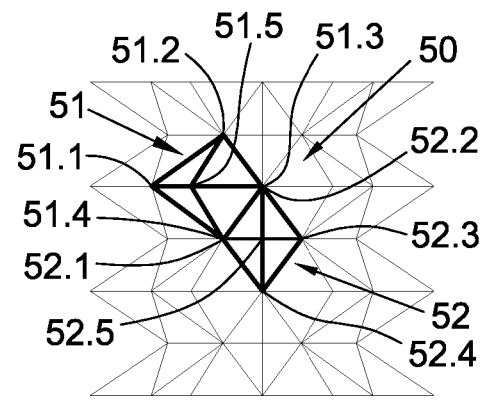
Figure 7G:
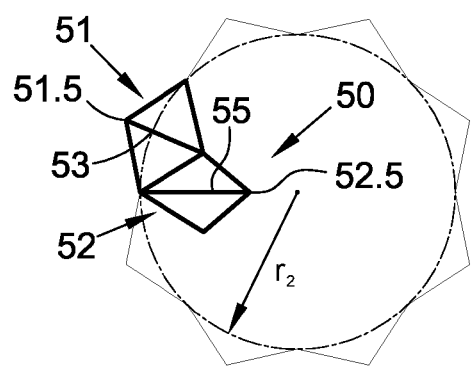
Figure 7H:
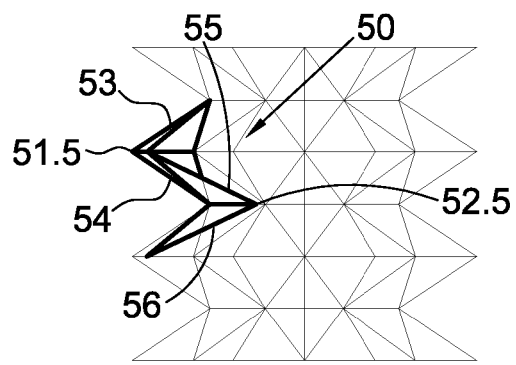
Figure 8E:
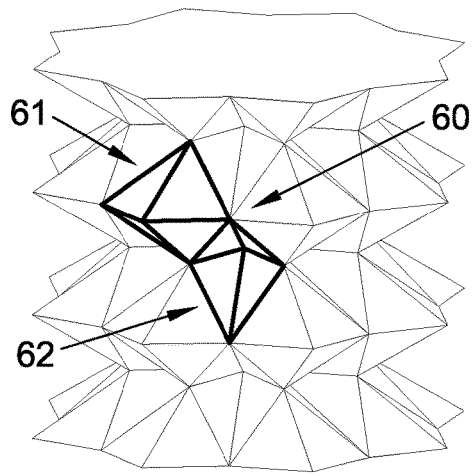
FIG. 8 shows a third embodiment of an element of the tessellation of elements of the device of FIG. 1 in which a perspective view, front view, top view and side view are shown in FIGS. 8(a) to 8(d) respectively, with the corresponding contracted states shown in FIGS. 8(e) to 8(h) respectively.
Figure 8F:
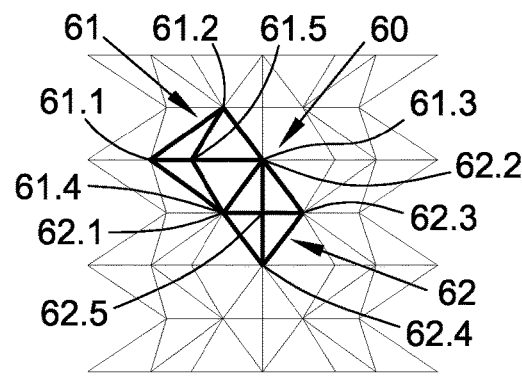
Figure 8G:
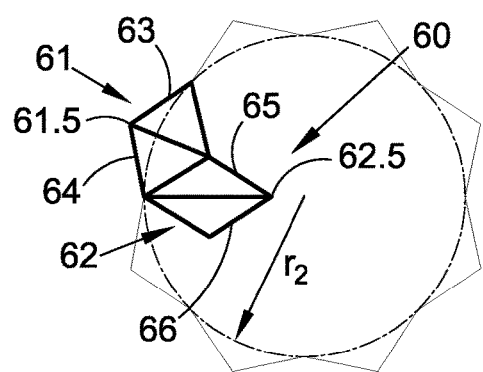
Figure 8H:
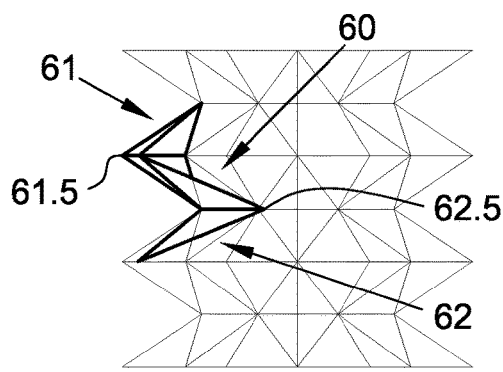

Angle α can be seen in FIG. 7*b* and FIG. 8*b* and is formed in a similar fashion to the theoretically ideal element described above.

A fourth embodiment of the element used in the tessellation is shown FIG. 9(*a*) to (*h*) and indicated by the reference sign 70. Conceptually the element 70 again has a protruding formation or pyramid 71 and an intruding formation or pyramid 72 but in this embodiment a wedge-like formation 73, 74 is inserted between the two halves of each pyramid 71 and 72 respectively. The wedges 73, 74 may be formed from the axial cross section of the pyramid. The pyramid 71 has a base essentially comprising nodes 71.1 to 71.4, respective base edges 71.12, 71.23, 71.34 and 71.41 extending therebetween and two vertices 71.5 and 71.6. Axial edges 71.25 and 71.26 extend from base node 71.2 and axial edges 71.45 and 71.56 from base node 71.4 to central vertexes 71.5 and 71.6 respectively and circumferential edges 71.15 and 71.36 extend between central vertexes 71.5 and 71.6 and base nodes 71.1 and 71.3 respectively. The vertices 71.5 and 71.6 form the base nodes of the wedge 73, which has vertices coinciding with nodes 71.2 and 71.4 respectively. The wedge 73 therefore effectively adds two triangular faces, which are defined by nodes 71.5, 71.6 and 71.2 and by nodes 71.5, 71.6 and 71.4 respectively. The intruding pyramid 72 essentially has base nodes 72.1 to 72.6, respective base edges 72.12, 72.23, 72.34, 72.45, 72.56 and 72.61 extending therebetween and a vertex 72.7. Axial edges 72.27, 72.37, 72.57 and 72.67 extend between central vertex 72.7 and base nodes 72.2, 72.3, 72.5 and 72.6 respectively and circumferential edges 72.17 and 72.47 extend between central vertex 72.7 and base nodes 72.1 and 72.4 respectively. In the pyramid 72 these nodes 72.2, 72.3, 72.5 and 72.6 form the base nodes of the wedge 74, which has a vertex coinciding with the vertex 72.7 of the pyramid 72. Again, base nodes 71.3 and 71.4 coincide with nodes 72.2 and 72.1 respectively. Therefore, the base edge 71.34 of the protruding pyramid 71 coincides with the base edge 72.12 of the intruding pyramid 72. In this embodiment the base edges 72.23 and 72.56, of the wedge 74, of the intruding pyramid 72, are coincident with the respective base edges of the wedges 74 of their axially adjacent intruding pyramids 72.

The orientation of the wedges 73 and 74 are reversed with respect to the pyramids 71 and 72, with the narrow end of the wedge proximal the central axis 22 and the wide end distal the central axis 22 such that the shape of the formations 71, 72 formed by the pyramids 71, 72 and the wedges 73, 74 defined by their base nodes follow the finite radius $r_2$. In this manner the geometry of the protruding pyramids or formations 71 and intruding pyramids or formations 72 remains equivalent, thereby resembling the ideal geometry of the embodiment of the element 40 shown in FIG. 6. In other words, the geometry of the protruding formations or pyramids 71 and intruding formations or pyramids 72 remains equivalent, as per the ideal geometry of FIG. 6, despite a finite radius $r_2$ by inserting a wedge 73, 74 between the two halves of each pyramid 71, 72.

It will be understood that the protruding formations 71 and the intruding formations 72 may be pyramidal in structure and shape. The protruding formations 71 may include the pyramids 41, 51, 61 similar to any of the previous embodiments and further include the wedges 73, wherein the wedges 73 are inserted to split said pyramids 41, 51, 61 in line with the central axis 22 to create the truncated or augmented pyramids 71. It will be further understood that the intruding formations 72 may include pyramids 42, 52, 62 similar to any of the previous embodiments and further include wedges 74, wherein the wedges 74 are inserted to split the pyramid 72 in line with the central axis 22 to create hexagonal pyramids 72.

In this embodiment of the element 70, the wedge angle defined by nodes 71.5, 71.2 and 71.6 rotates the tessellation around the cylindrical shape of the body 12, thereby allowing the geometry of the faces of the protruding 71 and intruding 72 pyramids to be equivalent. The length of the edge between node 71.2 and node 71.6 is equal to the length of the edge between node 72.2 and node 72.7. Also, the length of the edge between node 71.6 and node 71.3 is equal to the length of the edge between the node 72.7 and node 72.1.

In the embodiment of the element 70 the base of the pyramid 71 is effectively a polygon, particularly a quadrilateral, more particularly parallelogram. Best seen in FIG. 9(b) the lengths of the sides between the nodes 71.1 and 71.2 and the nodes 72.3 and 72.4 are equal. The lengths of the sides between the nodes 71.4 and 71.1, and the nodes 71.1 and 71.2 are in turn equal. Best seen in FIG. 9(c), the inclusion of the wedge 73 within the pyramid 71 effectively transforms the pyramid 71 into a truncated pyramid. In other words, the inclusion of the wedge 73 creates a shape substantially consistent with that of a truncated pyramid of which the top or outermost portion of the pyramid 71 is cut off. As a result, instead of having an apex in the form of a point (like the pyramid 72 and the pyramids of the other embodiments), the apex of the pyramid is in the form of an edge or line running between nodes 71.5 and 71.6. It should therefore be understood that the term "apex" should be interpreted broadly throughout the specification to mean the top or highest part of the pyramid and is not limited to describe an apex in the form of a point. The term "apex" is therefore used to describe the top or outermost portion of the pyramid, which may also be referred to as the peak, summit or pinnacle of the pyramid.

The base of the pyramid 72 is effectively a polygon, particularly a hexagon, more particularly an irregular hexagon in that the lengths of its sides are not all equal. Best seen in FIG. 9(b) the lengths of the sides between the nodes 72.1 and 72.2, the nodes 72.3 and 72.4, the nodes 72.4 and 72.5, and the nodes 72.6 and 72.1 are equal. The lengths of the sides between the nodes 72.2 and 72.3, and the nodes 72.5 and 72.6 are in turn equal. The hexagonal shape of the pyramid 72 is created by including the base nodes of the wedge 73 within the base of the pyramid. If not for the wedge 73, the base of the pyramid would have been the same as that of the pyramid 71.

Figure 9A:
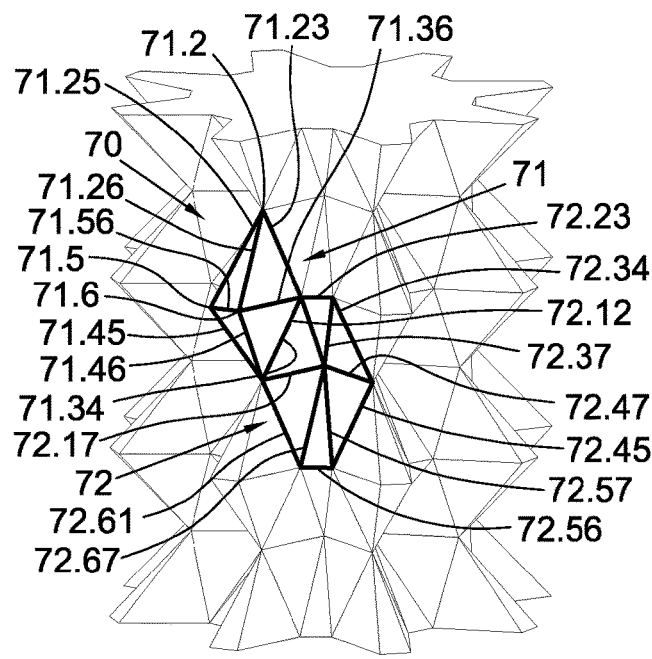
FIG. 9 shows a fourth embodiment of an element of the tessellation of the device of FIG. 1 in which a perspective view, front view, top view and side view are shown in FIGS. 9(a) to 9(d) respectively, with the corresponding contracted states shown in FIGS. 9(e) to 9(h) respectively.
Figure 9B:
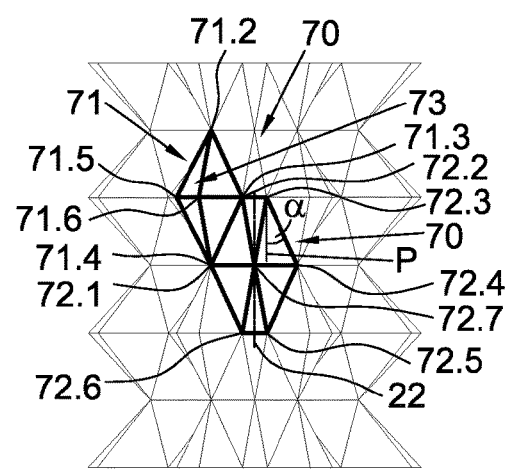
Figure 9C:
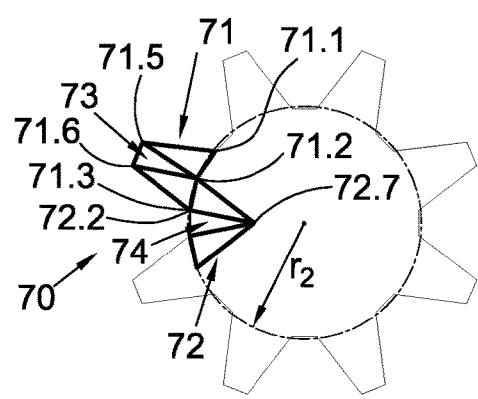
Figure 9D:
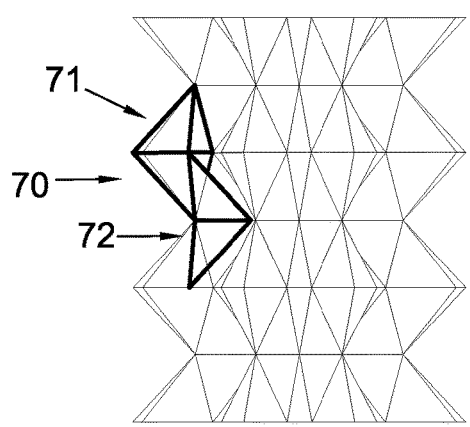
Figure 9E:
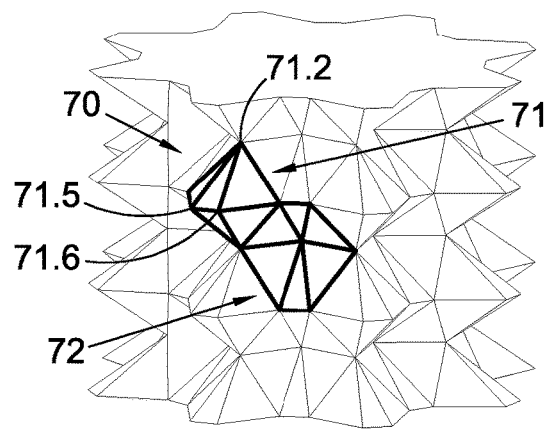
Figure 9F:
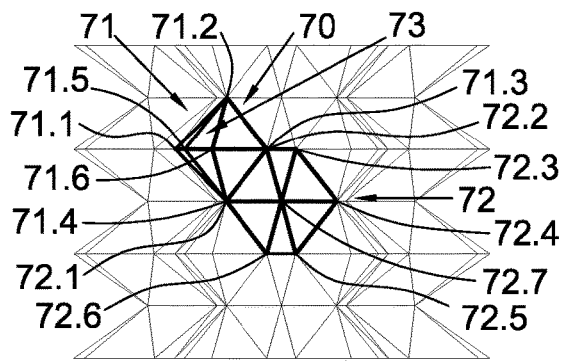
Figure 9G:
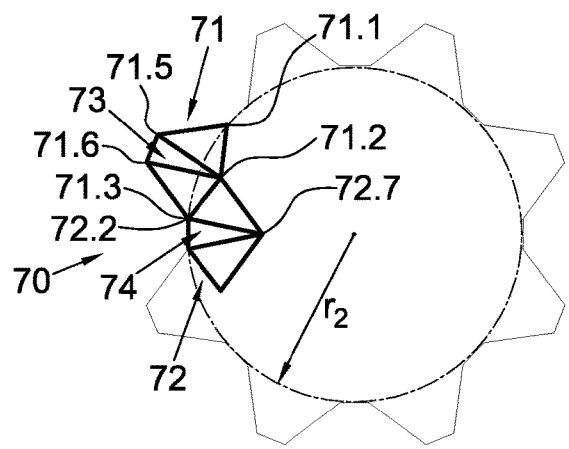
Figure 9H:
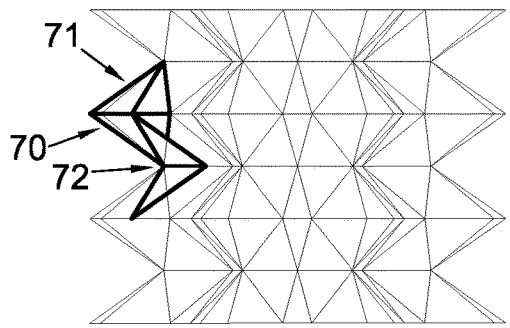

FIG. 9(b) shows an element of the actuator in its extended state. The angle α in the fourth embodiment is formed when the actuator is in the first extended state, as can be seen in FIG. 9(b), with axial length L1, between the base edges 71.12, 71.23, 71.34 71.41 of the protruding formations 71 or, the base edges 72.12, 72.34, 72.45 and 72.61 of the intruding formations 72 and the central axis 22, when the protruding formations 71 or intruding formations 72 are viewed radially in front or plan view as in FIG. 9b. Specifically the angle α is formed between the respective base edges 71.12, 71.23, 71.34 71.41, 72.12, 72.34, 72.45 and 72.61, that join the nodes of the axial edges 71.25, 71.26 71.45, 71.46, 72.27, 72.37, 72.57 and 72.67 and circumferential edges 71.15, 71.36, 72.17 and 72.47 of the respective formation 71, 72, and the central axis 22, and a plane P defined by the central axis 22 and a node 71.2, 71.4, 72.2, 72.3, 72.5, 72.6 of the respective base edge.

From the above description it should be understood that the elements 40, 50, 60 and 70 are effectively in the shape of a hollow polyhedron. The polyhedron typically has a base, which can be any polygon of four or more, preferably four to six, triangular faces that meet at an apex. The triangular sides are also referred to as lateral sides or lateral faces.

The above embodiments are each illustrated using a single protruding formation 41, 51, 61, 71 and a single intruding formation 42, 52, 62, 72 that comprise elements 40, 50, 60, 70 of the tessellation of elements 15. The tessellation of elements 15 is a repeating pattern comprised of a plurality of said elements 40, 50, 60, 70, comprising protruding formations 41, 51, 61, 71 and intruding formations 42, 52, 62, 72, that fit together without gaps or overlapping. Thus, base nodes 41.1, 41.2, 41.3, 41.4, 51.1, 51.2, 51.3, 51.4, 61.1, 61.2, 61.3, 61.4, 71.1, 71.2, 71.3, 71.4 and base edges 41.12, 41.23, 41.34, 41.41, 51.12, 51.23, 51.34, 51.41, 61.12, 61.23, 61.34, 61.41, 71.12, 71.23, 71.34, 71.41 of protruding formations 41, 51, 61, 71 are coincident with base nodes 42.1, 42.2, 42.3, 42.4, 52.1, 52.2, 52.3, 52.4, 62.1, 62.2, 62.3, 62.4, 72.1, 72.2, 72.3, 72.4, 72.5, 72.6 and base edges 42.12, 42.23, 42.34, 42.41, 52.12, 52.23, 52.34, 52.41, 62.12, 62.23, 62.34, 62.41, 72.12, 72.34, 72.45, 72.61 of adjacent intruding formations 42, 52, 62, 72 as described above in a repeating pattern of elements to form the tessellation of elements 15 of the cylindrical or substantially cylindrical wall 11 of the body 12 of the actuator. In particular, base nodes 41.1, 41.2, 41.3, 41.4, 51.1, 51.2, 51.3, 51.4, 61.1, 61.2, 61.3, 61.4, 71.1, 71.2, 71.3, 71.4 and or base edges 41.12, 41.23, 41.34, 41.41, 51.12, 51.23, 51.34, 51.41, 61.12, 61.23, 61.34, 61.41, 71.12, 71.23, 71.34, 71.41 of protruding formations 41, 51, 61, 71 are coincident with base nodes 42.1, 42.2, 42.3, 42.4, 52.1, 52.2, 52.3, 52.4, 62.1, 62.2, 62.3, 62.4, 72.1, 72.2, 72.3, 72.4, 72.5, 72.6 and or base edges 42.12, 42.23, 42.34, 42.41, 52.12, 52.23, 52.34, 52.41, 62.12, 62.23, 62.34, 62.41, 72.12, 72.34, 72.45, 72.61 of intruding formations 42, 52, 62, 72. In that the base nodes and/or base edges of protruding formations are each coincident with the, respective base node and/or base edge of an intruding formation. Wherein the each base node 41.1, 41.2, 41.3, 41.4, 51.1, 51.2, 51.3, 51.4, 61.1, 61.2, 61.3, 61.4, 71.1, 71.2, 71.3, 71.4 and/or base edge 41.12, 41.23, 41.34, 41.41, 51.12, 51.23, 51.34, 51.41, 61.12, 61.23, 61.34, 61.41, 71.12, 71.23, 71.34, 71.41 of the protruding formation 41, 51, 61, 71 bounds a face of said protruding formation 41, 51, 61, 71 and the base nodes 42.1, 42.2, 42.3, 42.4, 52.1, 52.2, 52.3, 52.4, 62.1, 62.2, 62.3, 62.4, 72.1, 72.2, 72.3, 72.4, 72.5, 72.6 and/or base edges 42.12, 42.23, 42.34, 42.41, 52.12, 52.23, 52.34, 52.41, 62.12, 62.23, 62.34, 62.41, 72.12, 72.34, 72.45, 72.61 of the intruding formation 42, 52, 62, 72 bound faces of the intruding formation 42, 52, 62, 72. Wherein each base node 41.1, 41.2, 41.3, 41.4, 51.1, 51.2, 51.3, 51.4, 61.1, 61.2, 61.3, 61.4, 71.1, 71.2, 71.3, 71.4 and/or base edge 41.23, 41.34, 41.41, 51.12, 51.23, 51.34, 51.41, 61.12, 61.23, 61.34, 61.41, 71.12, 71.23, 71.34, 71.41 of a face of the protruding formation 41, 51, 61, 71 is coincident with a respective base node 42.1, 42.2, 42.3, 42.4, 52.1, 52.2, 52.3, 52.4, 62.1, 62.2, 62.3, 62.4, 72.1, 72.2, 72.3, 72.4, 72.5, 72.6 and/or base edge 42.12, 42.23, 42.34, 42.41, 52.12, 52.23, 52.34, 52.41, 62.12, 62.23, 62.34, 62.41, 72.12, 72.34, 72.45, 72.61 of the adjacent face of the intruding formation 42, 52, 62, 72.

Figures 10, 11, 12:
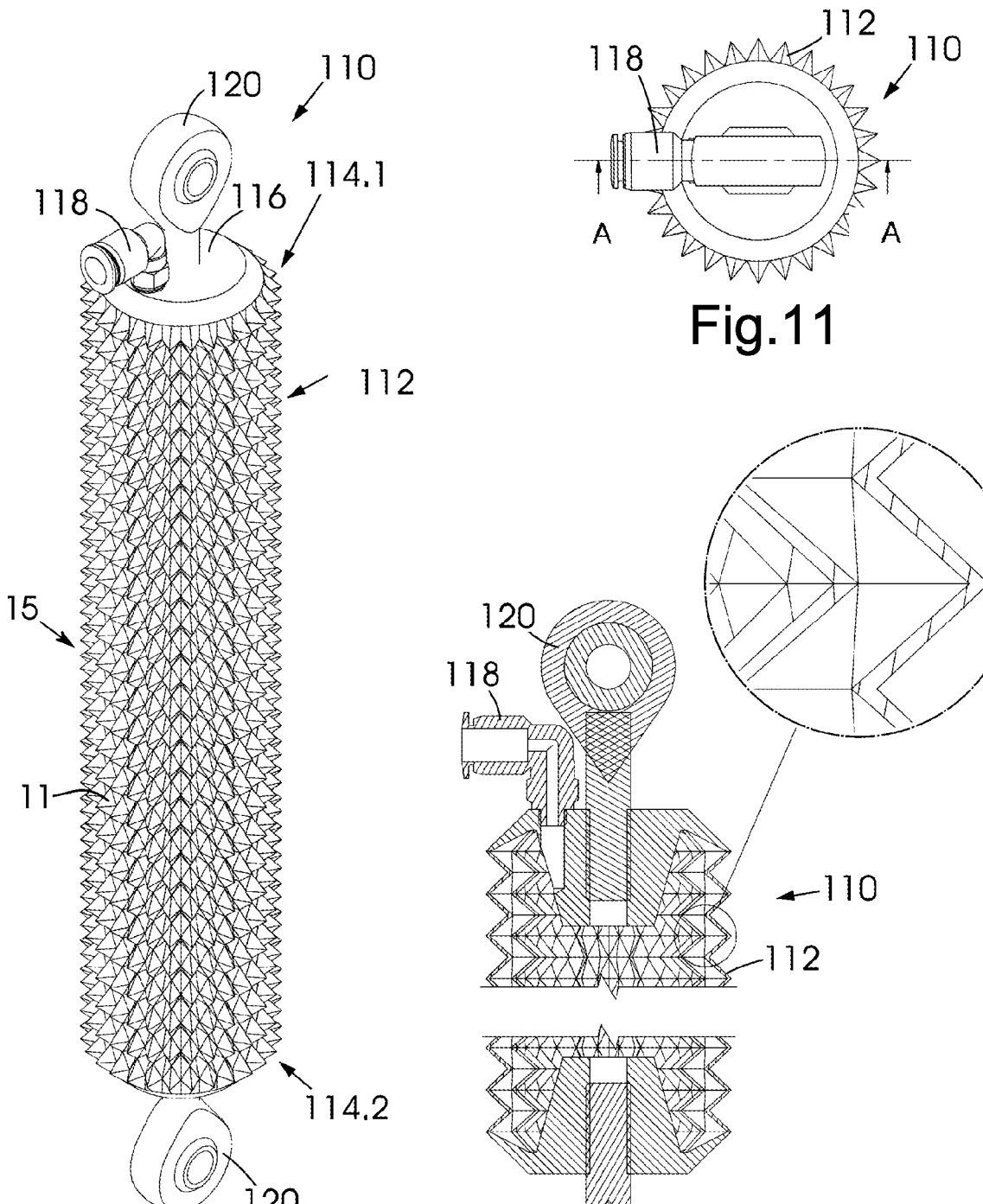
FIG. 10 shows a perspective view of an embodiment of a contractile device in accordance with the invention in which the device is shown as an actuator in its extended, unactuated state.
FIG. 11 shows a top view of the device of FIG. 10.
FIG. 12 shows a cross-sectional view of the device of FIG. 10 taken along A-A as shown in FIG. 11.

Referring now to FIGS. 10 to 12 a non-limiting example of a second embodiment of a device in accordance with the invention is generally indicated by reference numeral 110.

An alternative arrangement that may be used separately or in association with the device 10 of the above embodiments, the device 110 may have a substantially cylindrical body 112 and has a first end 114.1 and a second end 114.2. An end cap or fitting 116 is again located at each end 114.1, 114.2. The end cap 116 located at the first end 114.1 carries means for conveying fluid, such as a hose connector or fitting 118. In use, a hose for delivering fluid to the body 112 maybe connected to the hose fitting 118. In this alternative embodiment of the device 110, each end cap 116 carries connecting means for connection to an external component. In this embodiment the connection means is indicated as a joint, such as a rod end bearing 120 to create a mechanical connection capable of transmitting a force. In use, the rod end bearings 120 transfer or transmit the mechanical loads and displacements to external devices and mechanisms. This second embodiment of the device 110 of the invention comprises the most basic embodiment of the tessellation. The tessellation includes any of the elements 50, 60 or 70 as described above with reference to FIGS. 7, 8 and 9 respectively.

Referring now to FIG. 13 a non-limiting example of a third embodiment of a device in accordance with the invention is generally indicated by reference numeral 210. The device 210 is substantially similar to the device 110 except for the design of the elements of the tessellation. Accordingly, only the design of the elements for the tessellation will be described in detail.

The design of the elements used in the tessellation of the device 210 is aimed at providing greater actuator strength and improved stiffness distribution throughout the device 210 and particularly its body 212 comprising the tessellation. As shown in FIG. 13, an element 240 substantially in the form of a rectangular unit or element is used in the tessellation. The tessellation of the device 210 again comprises protruding and intruding pyramids but, instead of the element 240 comprising two fully formed pyramids as in the elements 40, 50, 60 and 70 shown in FIGS. 6 to 9, the rectangular element 240 is chosen to include two halves the protruding 241 and intruding 242 pyramids. The rectangular element 240 is used below to illustrate the following means for reducing stress concentrations at the vertices and edges of the protruding 241 and intruding 242 pyramids of the tessellation of elements 15 through stress reducing formations.

The element 240 is shown in greater detail in FIG. 14(a) to (c). The element 240 comprises nodes or vertices 243.1 to 243.9. The lines 244.1 to 244.4 indicate the links or joints between the protruding 241 and intruding 242 pyramid halves. The edges or corners of the pyramids 241, 242 are filleted in order to reduce stress concentrations in these regions. The filleted edges are indicated by the reference sign 245.

It is envisaged that in order to manufacture the body 212 comprising the tessellation from the elements 240 from a single material it will generally be required to use softer materials, such as polyurethane elastomers for example. The operating fluid pressure will generally also be limited. These measures are typically required in order to prevent high stress concentrations, particularly at the vertices 243.1 to 243.9, and in-plane stretching and out-of-plane bending of the non-filleted faces 246.1 to 246.8, thereby preventing loss of performance or failure of the body 212.

To address the limitations of the element 240 it is envisaged that the stress concentrations at the vertices 243.1 to 243.9 can be reduced by using material in the regions of the vertices that is softer than the material used in the rest of the element 240. The softer material in the regions of the vertices 243.1 to 243.9 will typically have higher strain to failure than the material used in the rest of the element, such as in the planes or faces 246.1 to 246.8. It is further envisaged that the regions of the fillets 245 and vertices 243.1 to 243.9 as well as the joints 244.1 to 244.4 between the pyramids 241, 242 could be made from a high-strength material with relatively low flexural modulus, such as Kevlar® fibre in a soft polymer matrix, such as a polyurethane matrix for example. In the regions of the faces 246.1 to 246.8 the element 240 could be made from a stiffer material compared to the material used in the fillets, vertices and joints. The stiffer material may be a carbon fibre epoxy composite, for example. By using this material configuration in the element 240 the body 212 and, accordingly, the device 210 is capable of higher operating fluid pressure.

Figure 15A:
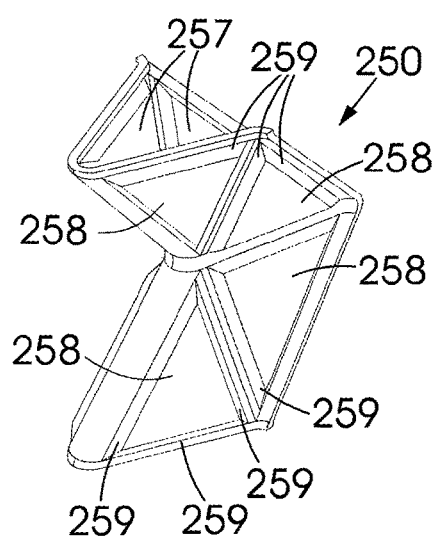
FIG. 15 shows an alternative embodiment of the tessellation element of the device of FIG. 13 in which the wall thickness is increased, wherein a perspective view, top view and cross-sectional view taken along C-C are shown in FIGS. 15(a) to 15(c) respectively.
Figure 15B:
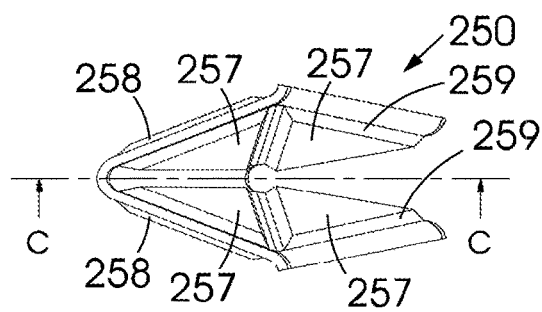
Figure 15C:
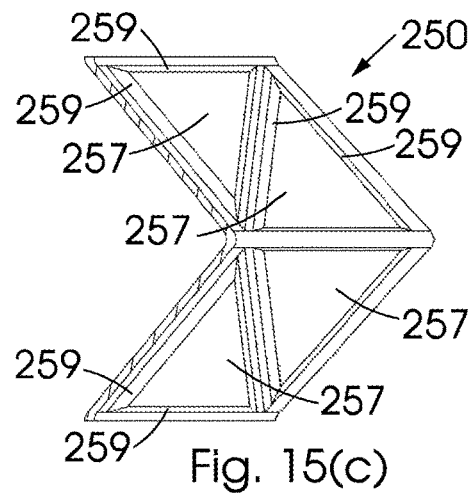

An alternative embodiment of the element used in the tessellation of the device 210 is shown in FIG. 15(a) to (c). This embodiment of FIG. 15 is indicated by the numeral 250 and is substantially similar to the element 240 apart from the regions of the faces 246.1 to 246.8. In the element 250 the wall thickness of the element is increased both internally and externally in the regions of the faces 246.1 to 246.8. The internally extending protrusions 257 and externally extending protrusions 258 are finished off with chamfers 259 that reduce the wall thickness again in the regions of the fillets 245, vertices 243.1 to 243.9 and joints 244.1 to 244.4. This embodiment of the element 250 reduces the in-plane stretching and out-of-plane bending of the faces 246.1 to 246.8 whilst still allowing the body 212 to be manufactured from a single material. Although the wall thickness is shown to increase both internally and externally in FIG. 15, it is envisaged that in an alternative embodiment not shown in the drawings the wall thickness could increase either internally or externally only. It is further envisaged that, although the areas 257, 258 of increased wall thickness is shown to be connected to the filleted regions 245 using chamfers 259, other geometrically shaped connections could be used, such as straight drops, fillets and so forth. The invention is therefore not limited to any particular shape of connection between the areas of increased thickness and the areas where the thickness is not increased, such as the filleted regions 245, vertices 243.1 to 243.9 and joints 244.1 to 244.4.

It is further envisaged that any stress concentrations in the regions of the vertices 243.1 to 243.9 could be reduced by employing any of the methods described above with reference to the other embodiments of the elements used in the tessellation according to the invention.

Figure 16A:
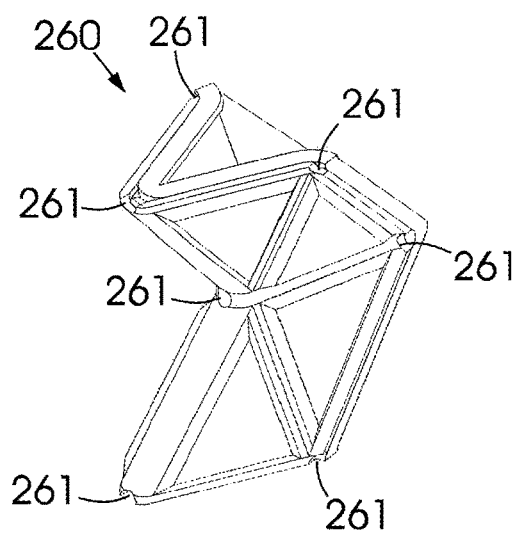
FIG. 16 shows an alternative embodiment of the tessellation element of the device of FIG. 13 in which holes are located at its vertices, wherein a perspective view, top view and cross-sectional view taken along D-D are shown in FIGS. 16(a) to 16(c) respectively.
Figure 16B:
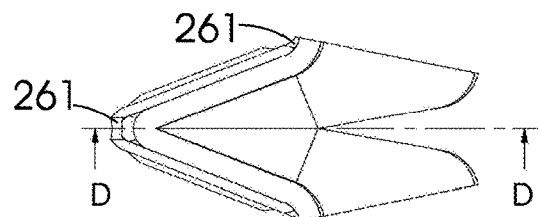
Figure 16C:
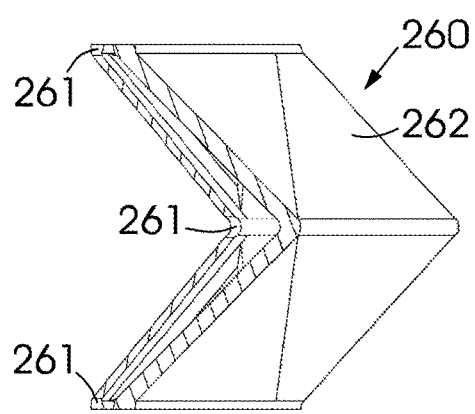

Another embodiment of the element used in the tessellation of the device 210 is shown in FIG. 16(a) to (c). This embodiment of FIG. 16 is indicated by the numeral 260 and is substantially similar to the element 250 apart from the regions of the element in the vertices. In the element 260 the wall thickness of the element is increased substantially similarly to the element 250 and will therefore not be described again. However, the element 260 differs from the element 250 in that the element 260 includes means for reducing stress concentrations in the regions at its vertices 243.1 to 243.9. In this embodiment of the element 260 the means for reducing stress concentrations is in the form of holes 261 located in the regions at the vertices. Although the holes 261 are shown to be circular in FIG. 16, the invention is not limited to circular holes. It should be understood that the invention covers the principle of removing material at the vertices so as to reduce stress concentration at the vertices.

To maintain fluid impermeability of the body 212 a separate membrane or film 262 is used. The impermeable membrane runs internally along substantially the entire body 212. The membrane 262 is preferably made from a soft, elastic material.

Figure 17A:
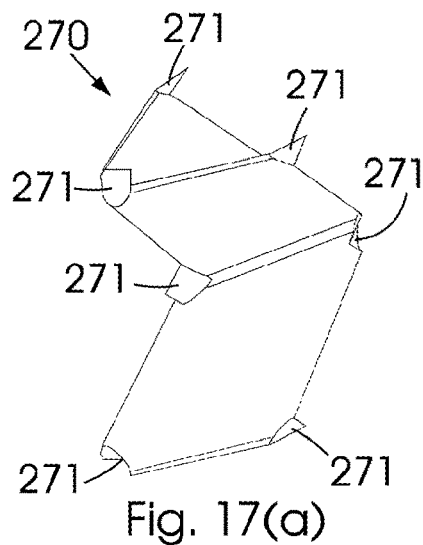
FIG. 17 shows an alternative embodiment of the tessellation element of the device of FIG. 13 in which cones or pyramids are located at its vertices, wherein a perspective view, top view and cross-sectional view taken along E-E are shown in FIGS. 17(a) to 17(c) respectively.
Figure 17B:
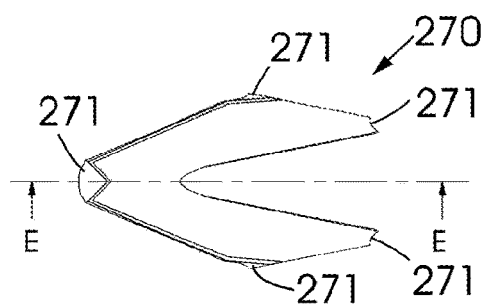
Figure 17C:
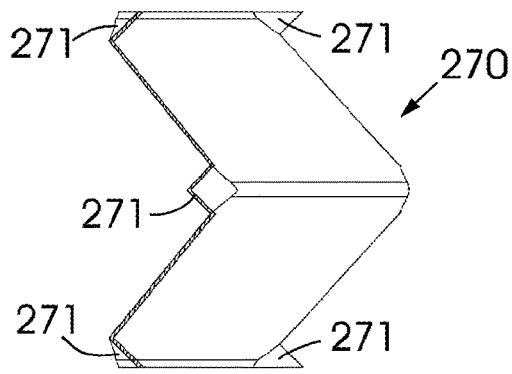

Another embodiment of the element used in the tessellation of the device 210 is shown in FIG. 17(a) to (c). This embodiment of FIG. 17 is indicated by the numeral 270 and includes alternative means for reducing stress concentrations in the regions at its vertices 243.1 to 243.9. The element 270 is substantially similar to the element 240 and, accordingly, only the means for reducing stress concentrations at its vertices will be described in detail. In this embodiment of the element 270 the means for reducing stress concentrations is in the form of stress reducing formations other than the holes 261 used in the element 260. In this particular embodiment the stress reducing formations are in the form of cones or pyramids 271, which are inverted relative to the underlying vertex geometry.

Figure 18A:
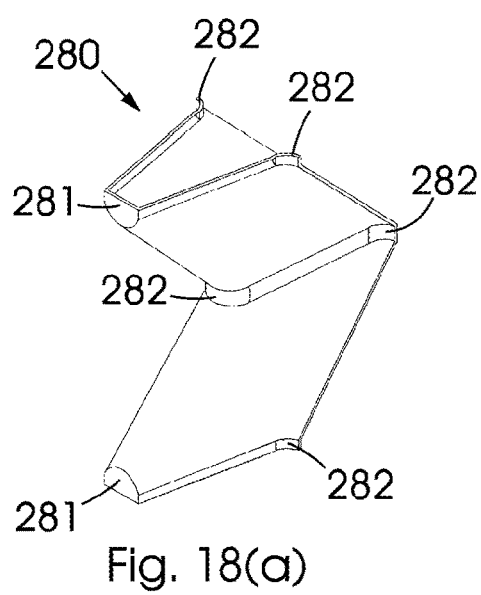
FIG. 18 shows an alternative embodiment of the tessellation element of the device of FIG. 13 in which flat and curved sections are located at its vertices, wherein a perspective view, top view and cross-sectional view taken along F-F are shown in FIGS. 18(a) to 18(c) respectively.
Figure 18B:
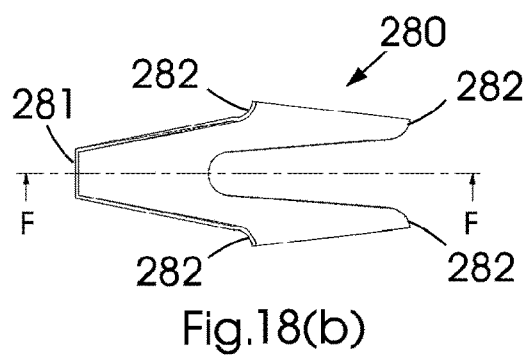
Figure 18:
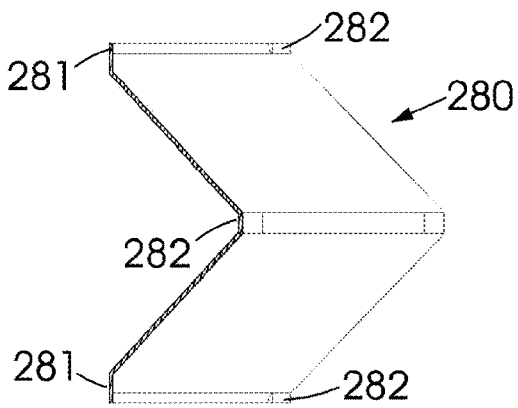
Figure 20:
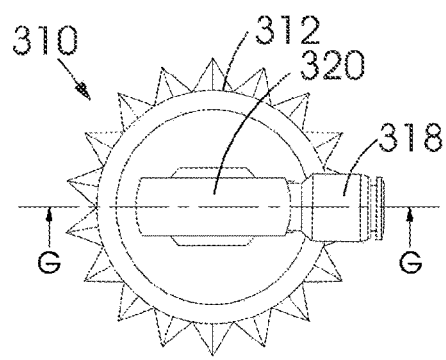
FIG. 20 shows a top view of the device of FIG. 19.

Yet another embodiment of the element used in the tessellation of the device 210 is shown in FIG. 18(a) to (c). This embodiment of FIG. 18 is indicated by the numeral 280 and includes alternative means for reducing stress concentrations in the regions at its vertices 243.1 to 243.9. The element 280 is substantially similar to the element 270 and, accordingly, only the means for reducing stress concentrations at its vertices will be described in detail. In this embodiment of the element 280 the stress reducing formations used to reduce stress concentrations at the vertices are in the form flat 281 or curved 282 stress reducing formations or sections relative to the underlying, spherical vertex geometry.

It should be understood that the stress reducing formations 271, 281, 282 used in elements 270 and 280 to reduce the stress concentrations at the vertices effectively reduce or eliminate the Gaussian curvature at the vertices. It should therefore be understood that the invention is not limited to the geometries of the stress reducing formations illustrated in the drawings. It is further envisaged that features from the different stress reducing formations at the vertices and faces of the embodiments described above could be combined.

Figure 19:
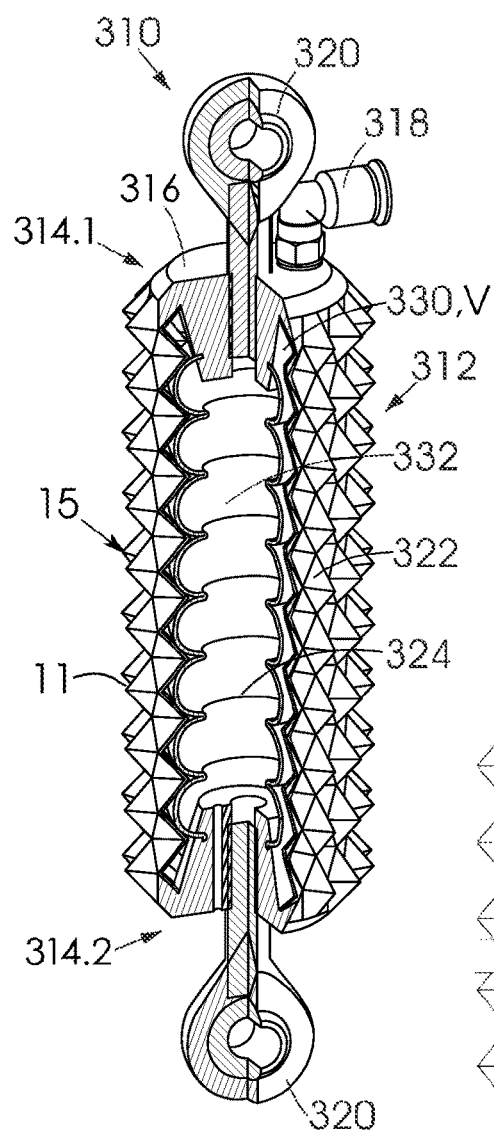
FIG. 19 shows a perspective view of a fourth embodiment of a contractile device in accordance with the invention in which the device is shown as an actuator in its unactuated state, wherein an internal bellows type structure is located within the tessellation structure.

Referring now to FIG. 19 a non-limiting example of a fourth embodiment of a device in accordance with the invention is generally indicated by reference numeral 310. The device 310 is substantially similar to the device 210. The device 310 again has a substantially cylindrical body 312 comprising a tessellation of elements 15. The elements of the body 312 may be any of the elements described above with reference to the other embodiment of the device 10, 110, 210. The device 310 again has a first end 314.1 and a second end 314.2, and end caps or fittings 316 located at the ends. The device 310 again has a hose connector or fitting 318 and connecting means 320 for connection to an external component.

Figure 21:
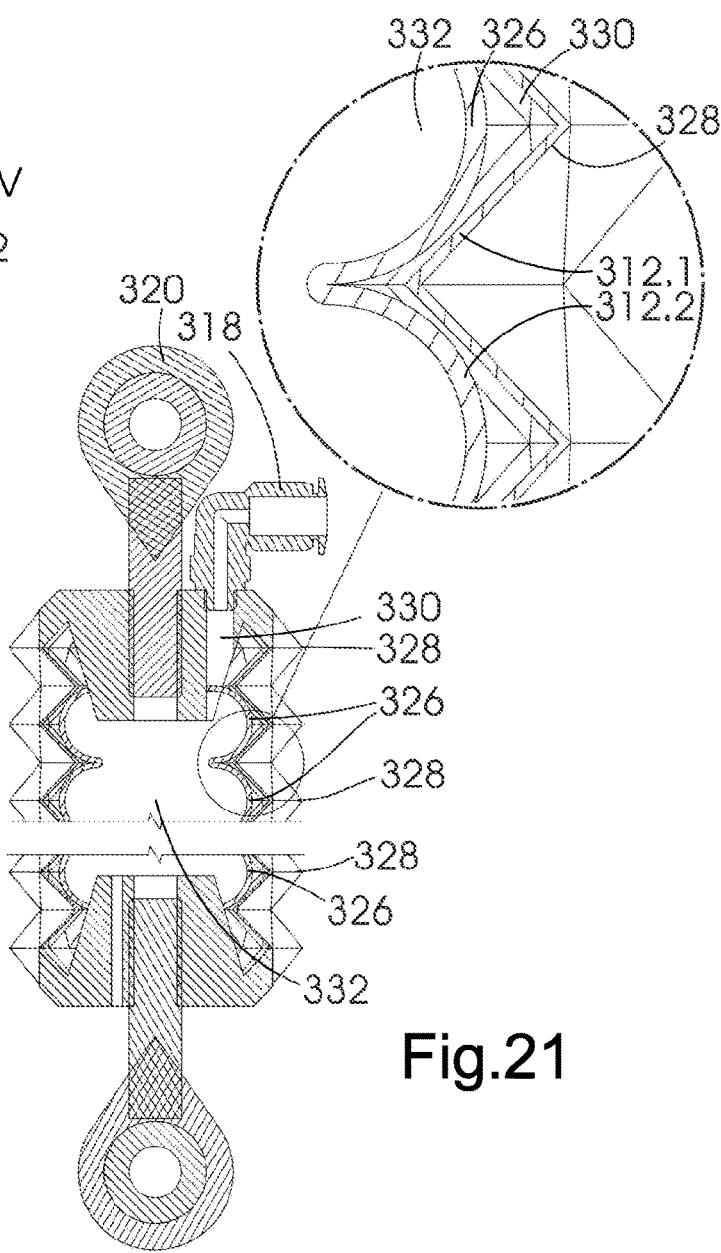
FIG. 21 shows a cross-sectional view of the device of FIG. 19 taken along G-G shown in FIG. 20.
Figure 23:
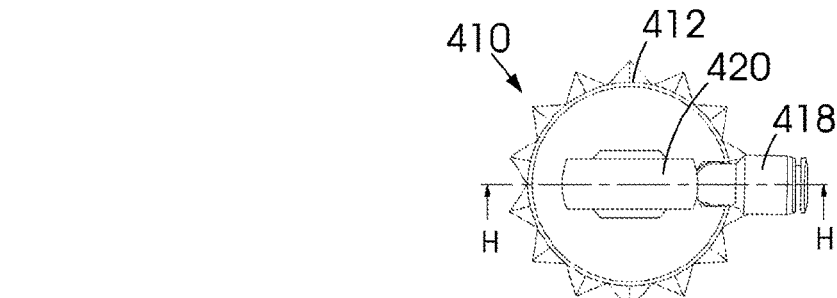
FIG. 23 shows a top view of the device of FIG. 22.

However, the most significant difference between the device 310 and the other devices 10, 110, 210 is that its body 312 is multi-layered. In this particular embodiment the body 312 has a first side wall 312.1 and a second side wall 312.2. The first side wall 312.1 is defined by a first structure 322 comprising the tessellation of elements 15 as described above while the second side wall 312.2 is defined by a second structure 324 located within the first structure. In the device 310 the second structure 324 is in the form of a bellows type structure. Best seen in FIG. 21, the bellows type structure 324 is arranged inside the first structure 322 such that the bellows 326 coincide with the peaks or protruding sections 328 of the first structure 322.

The first 322 and second 324 structures are arranged such that the device 310 defines a first or primary volume 330 and a second or secondary volume 332 that are independent of each other. In this configuration, the fluid inside the internal volumes 330, 332 may be pressurised independently. Still referring to FIG. 21 it can be seen that the hose fitting 318 is in fluid communication with the first internal volume 330 defined between the first 312.1 and second 312.2 side walls (i.e. between the first 322 and second 324 structures). In use, the fluid inside the first volume 330 act as the operating fluid for actuation or pumping/compression. It is however envisaged that fluid inside the second volume 332 could be used to influence actuation.

Figure 22:
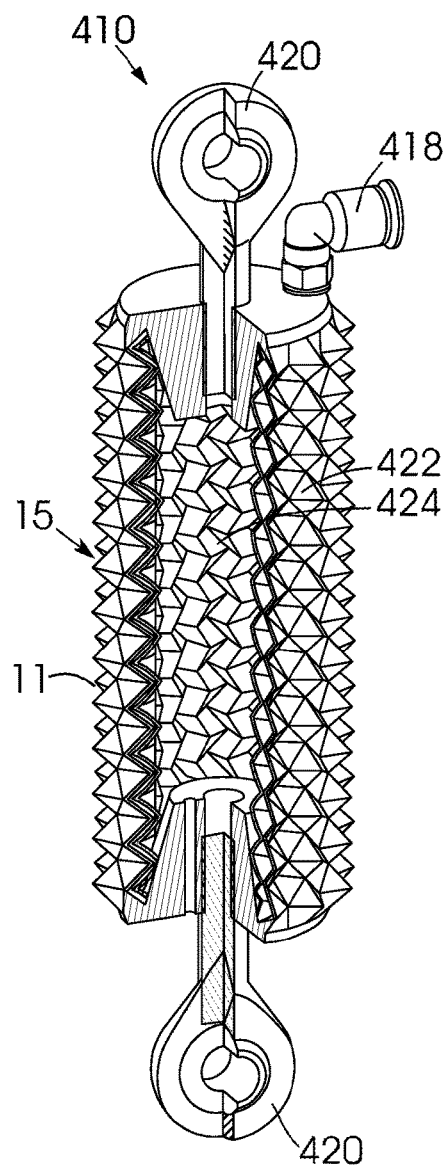
FIG. 22 shows a perspective view of a fifth embodiment of a contractile device in accordance with the invention in which the device is shown as an actuator in its unactuated state, wherein an internal re-entrant structure is located within the tessellation structure.

Referring now to FIG. 22 a non-limiting example of a fifth embodiment of a device in accordance with the invention is generally indicated by reference numeral 410. The device 410 is substantially similar to the device 310 apart from the replacement of the internal bellows type structure 324 with a re-entrant structure 424.

Figure 24:
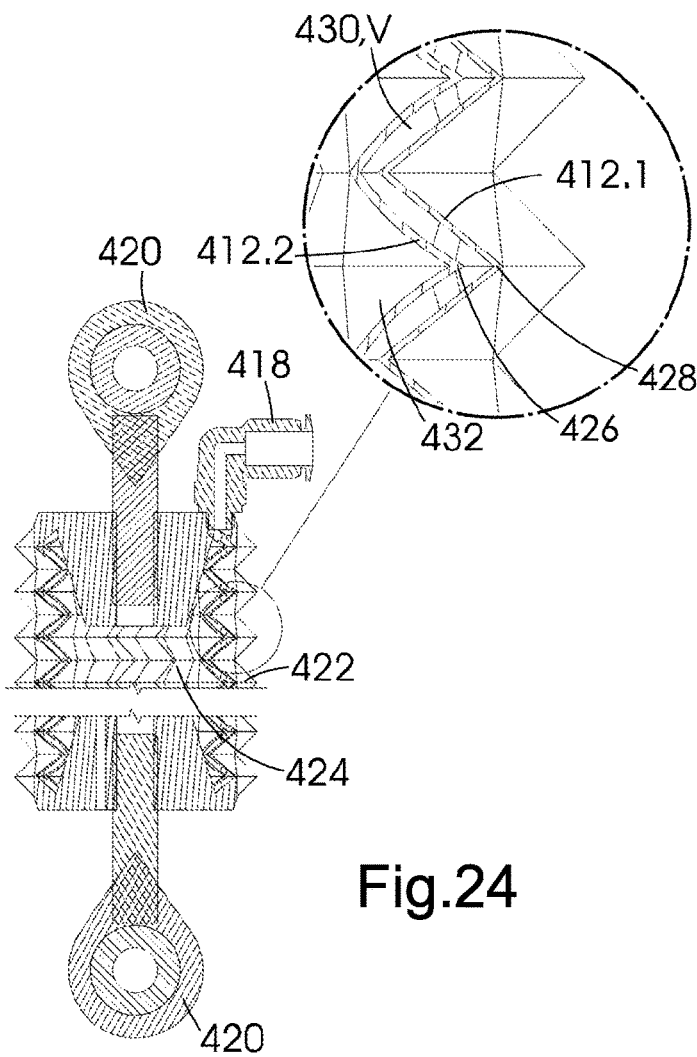
FIG. 24 shows a cross-sectional view of the device of FIG. 22 taken along H-H shown in FIG. 23.

The re-entrant structure 424 is best seen in FIG. 24. Similarly, to the device 310, the re-entrant structure 424 is again arranged such that its peaks 426 coincide with the peaks 428 of the first structure 422. In use, upon deformation of the device 410 and in particular the first 422 and second 424 structures of the body 412, the volumetric area of the first volume 430 increases. It should be clear that this increase in volume is due to the radial contraction of the re-entrant structure 424 upon deformation due to an increase in fluid pressure inside the first volume 430. As a result of the increased volume upon deformation of the device 410 an increase in actuator work output is achieved.

Although the second, internal structure 424 is described as a re-entrant structure it is envisaged that any auxetic structure, i.e. a structure that has a negative Poisson's ratio, could be used.

An advantage of the devices 310, 410 of the invention is that the constraint that the angle α should be less than 55° can be relaxed while still resulting in contractile actuation. In other words, the devices 310, 410 will still contract axially upon actuation, i.e. an increase in internal pressure, even if the angle α is greater than 55°.

It is envisaged that the device 10, 110, 210, 310, 410 of the invention, particularly its body 12, 112, 212, 312, 412 can be manufactured using any of a variety of additive manufacturing processes, such as fused filament fabrication (FFF), also known as fused deposition modelling (FDM), powder bed, selective laser sintering (SLS), selective laser melting (SLM), stereolithography, and PolyJet processes. Alternatively, the device 10, 110, 210, 310, 410 of the invention may be manufactured using thermo-forming processes, such as blow moulding, injection moulding, and rotational moulding. It is further envisaged that the device according to the invention could be manufactured using metals through forging and stamping. Alternatively, composite manufacturing processes could be used. The composite manufacturing processes include but are not limited to the use of pre-impregnated and dry materials both in and out of autoclaves, as well as hot forming, tape laying and resin transfer moulding.

It is further envisaged that a range of different materials could be used to manufacture the device 10, 110, 210, 310, 410 of the invention, particularly its body 12, 112, 212, 312, 412 comprising the tessellation of elements 15. The materials including but are not limited to thermo-polymers Acetal (Delrin®), Nylon, acrylonitrile butadiene styrene (ABS), polyethylene terephthalate glycol (PETG), polyethylene terephthalate (PET), thermoplastic polyurethanes (TPU), Polyethylene (high density PE (HDPE), low density PE (LDPE), linear low density PE (LLDPE), ultra-high molecular weight PE (UHMWPE)), poly vinyl chloride (PVC), polyetheretherketone (PEEK), polyphenylene sulfide (PPS), Polystyrene, Polysulfone, polybutylene terephthalate (PBT), polytetrafluoroethylene (PTFE), polyvinylidene fluoride (PVDF), Polycarbonate and Polypropylene (Homopolymer and Copolymer). The device 10, 110, 210, 310, 410 of the invention, particularly its body 12, 112, 212, 312, 412, may also be manufactured in whole or part from thermoset plastics, such as epoxy, polyimide, polyurethane, silicone, vinyl and natural rubbers for example. It is further envisaged that the device of the invention, and in particular its body, could be manufactured from metals, particularly if superelastic alloys are used. It is also envisaged that composites formed in part from the materials mentioned above could be used to manufacture the device 10 when using fibres of Glass (E, AR and S glass), carbon (HM and HS), Boron, polyamide (Kevlar®, Twaron®), polyester (Vectron®), Polybenzoxazole (PBO, Zylon®), Polybenzothiazoles (PBT), Polybenzimidazole (PBI) or Ultra-High Molecular Weight Polyethylene (Dyneema®).

From the above description of the device in accordance with the invention it should be understood that a significant advantage of the device is that a McKibben style actuator is obtained without the need for complicated braids and membranes of known McKibben actuators. As a result, the device of the invention may be manufactured from a single material, i.e. free from reinforcements. This allows the device of the invention to be produced from a range of materials and using processes that are incompatible with known McKibben actuators.

Another, significant advantage of the invention is that the device is capable of withstanding pressures beyond that achievable in known contractile actuators. The device of the invention is also suitable for use as a pump or compressor in harsh operating environments.

By using a wall 11 comprising a tessellation of protruding and intruding formations 41, 42, 51, 52, 61, 62, 71, 72 including quadrilateral pyramids, the device 10 of the invention is capable of linking internal pressure to external force in a manner that is to some extent equivalent to a McKibben style actuator. Contractile actuation, also referred to as tensile contraction as a result of the tensile force generated during actuation, is achieved upon increase in internal fluid pressure P, whilst applying tensile pumping force leads to a decrease in contained fluid volume, all while maintaining a cylindrical form.

The fluidic bellows type contractile device in accordance with the invention maintains the high weight specific performance and cylindrical pressurised form of McKibben class of actuators, through a bellows design, thereby allowing manufacture through accessible additive manufacturing techniques, low-cost thermo-forming processes and from high-performance composite materials. These manufacturing and material options respectively allow for improved tailorability, reduced cost, and increased force to weight ratios (higher operating pressure both in actuating and pump/compressor configuration) beyond that achieved prior in known bellows or McKibben type fluidic devices.

While the primary function of the invention is in the transduction of energy from or to a pressurised fluid (as an actuator or pump/compressor), the actuator can act as an elastic member, wherein the body 12 of the device 10 possesses a stiffness k in the direction of the central axis 22. Therefore, when deformed from the first normal state to the second deformed state the device 10 stores material elastic energy during this process creating a force f that acts to return the device 10 to the first normal position from the second deformed position. This allows the invention to act as a spring, applying a force, opposite in direction to the actuating force, when the fluid pressure is removed. Thus, the invention can replace both actuator and spring in applications where they are currently applied as two separate but connected components, for example in a fail closed or fail open valve actuator.

The stiffness k may provide a force F in the direction to return the actuator to the first normal state. The force F may be sufficient in use to return the actuator and the load on which it is acting to the normal state. The stiffness k may be greater than 1 N/mm.

It will be appreciated that the above description only provides some embodiments of the invention and that there may be many variations without departing from the spirit and/or the scope of the invention. It is easily understood from the present application that the particular features of the present invention, as generally described and illustrated in the figures, can be arranged and designed according to a wide variety of different configurations. In this way, the description of the present invention and the related figures are not provided to limit the scope of the invention but simply represent selected embodiments.

The skilled person will understand that the technical characteristics of a given embodiment can in fact be combined with characteristics of another embodiment, unless otherwise expressed or it is evident that these characteristics are incompatible. Also, the technical characteristics described in a given embodiment can be isolated from the other characteristics of this embodiment unless otherwise expressed.

The invention claimed is:

1. A contractile device comprising a body having a central axis, an internal volume (V), a radius r2 perpendicular to said central axis and a wall including a tessellation of elements, wherein the body is axially deformable along the central axis between a first state having a first axial length (L1) having a first internal volume (V1) and a second state having second axial length (L2) having a second internal volume (V2) in which the second axial length (L2) of the body is reduced and the second volume (V2) increased compared to the first axial length (L1) and first internal volume (V1), wherein the tessellation of elements includes a series of protruding formations protruding radially outward from a corresponding series of first base nodes at r2 and intruding formations intruding radially inward from a corresponding series of second base nodes at r2, the a series of protruding formations and intruding formations are arranged such that the body remains substantially cylindrical through its deformation between the first axial length (L1) and the second axial length (L2).

2. The contractile device of claim 1, wherein each of the first base nodes of the protruding formations is coincident with one of the second base nodes of the intruding formations.

3. The contractile device of claim 1, wherein the protruding formations and intruding formations each include base edges.

4. The contractile device of claim 3, wherein the base edges are positioned the radius r2 from the central axis and/or wherein each base edge of the protruding formations is coincident with a base edge of the intruding formations.

5. The contractile device of claim 3, wherein the device is in its first state and wherein the protruding formations and intruding formations define an angle α between said base edges and the central axis, and the angle α is less than 55 degrees.

6. The contractile device of claim 1, wherein the protruding formations and intruding formations of the tessellation of elements comprise protruding pyramids and intruding pyramids.

7. The contractile device of claim 6, wherein the protruding pyramids and intruding pyramids are quadrilateral or hexagonal pyramids.

8. The contractile device of claim 7, wherein the protruding pyramids are in the form of quadrilateral pyramids, and the intruding pyramids are in the form of hexagonal pyramids.

9. The contractile device of claim 1, wherein the protruding formations and intruding formations comprise quadrilateral and hexagonal pyramids formed by including a wedge-shape formation in each pyramid, and wherein the orientation of the wedge-shaped formations included in the quadrilateral pyramids and hexagonal pyramids respectively are reversed so as to form truncated quadrilateral protruding pyramid and hexagonal intruding pyramid.

10. The contractile device of claim 1, comprising stress reducing formations at vertices of the tessellation of elements.

11. The contractile device of claim 1, wherein the protruding formations and intruding formations comprise edges running between its vertices so as to define faces between the edges, and wherein protruding formations and intruding formations comprise face members for reducing in-plane stretching and out-of-plane bending of the faces.

12. The contractile device of claim 11, wherein regions of the faces of the protruding formations and intruding formations are manufactured from a material that has an increased stiffness compared to a material in regions of the vertices and edges of the protruding formations and intruding formations.

13. The contractile device of claim 11, wherein regions of the faces of the protruding formations and intruding formations have an increased wall thickness compared to regions of the protruding formations and intruding formations in the edges and vertices.

14. The contractile device of claim 13, wherein the increased wall thickness is created by external and/or internal protrusions carried by the faces of the protruding formations and intruding formations.

15. The contractile device of claim 1, wherein the body includes a second, internal wall defined by a second structure located within the first structure defining the wall carrying the tessellation of elements, wherein a space between the first wall and second wall define a primary volume in which an operating fluid is receivable, and wherein an internal space within the second wall define a secondary volume which is independent from the primary volume.

16. The contractile device of claim 15, wherein the second structure defining the second wall is an auxetic structure.

17. The contractile device of claim 16, wherein the second structure defining the second wall is a bellows-type structure or a re-entrant structure.

18. The contractile device of claim 1 that is an elastic member, wherein the body of the device possesses a stiffness k in the direction of the central axis that acts to return the body from the second state to the first state.

19. A valve moved by the contractile device of claim 1.

20. A valve moved by the contractile device according to claim 19 where the contractile device is an elastic member, wherein the body of the device possesses a stiffness k in the direction of the central axis that acts to return the body from the second state to the first state, that is a fail closed or fail open valve actuator.

21. A contractile device comprising a body having a central axis, an internal volume (V), a radius r2 perpendicular to said central axis and a wall including a tessellation of elements, wherein the body is deformable through pressurisation of fluid within the body between a first, normal state having a first axial length (L1) and a first internal volume (V1) and a second, deformed state having a second axial length (L2) and a second internal volume (V2) in which the second axial length (L2) of the body is reduced and the second volume (V2) increased compared to the first axial length (L1) and first internal volume (V1) of the first, normal state, wherein the tessellation of elements includes a series of protruding formations protruding radially outward from a corresponding series of first base nodes at r2 and intruding formations intruding radially inward from a corresponding series of second base nodes at r2, the a series of protruding formations and intruding formations are arranged such that the body remains substantially cylindrical through its deformation between its normal and deformed states.

22. A contractile device comprising a body having a central axis, an internal volume (V), a radius r2 perpendicular to said central axis and a wall including a tessellation of elements, wherein the body is deformable through extension of the body between a second, normal state having a second axial length (L2) and a second internal volume (V2) and a first, deformed state having a first axial length (L1) and a first internal volume (V1) in which the second axial length (L2) of the body is reduced and the second volume (V2) increased compared to the first axial length (L1) and first internal volume (V1) of the first, deformed state, wherein the tessellation of elements includes a series of protruding formations protruding radially outward from a corresponding series of first base nodes at r2 and intruding formations intruding radially inward from a corresponding series of second base nodes at r2, the a series of protruding formations and intruding formations are arranged such that the body remains substantially cylindrical through its deformation between its normal and deformed states.

* * * * *